United States Patent
Garg et al.

(10) Patent No.: US 10,708,383 B2
(45) Date of Patent: Jul. 7, 2020

(54) IDENTIFYING PROFILE INFORMATION OF SENDERS OF DIRECT DIGITAL MESSAGES

(71) Applicant: Facebook, Inc., Menlo Park, CA (US)

(72) Inventors: Vivek Garg, Seattle, WA (US); Li Hua, Bellevue, WA (US); Joshua Gordon Selbo, Seattle, WA (US); Johnathan Harms, Seattle, WA (US); Stephane Taine, Issaquah, WA (US); Michael Leggett, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 195 days.

(21) Appl. No.: 15/793,829

(22) Filed: Oct. 25, 2017

(65) Prior Publication Data
US 2019/0124177 A1 Apr. 25, 2019

(51) Int. Cl.
| | |
|---|---|
| *H04L 29/08* | (2006.01) |
| *H04M 3/38* | (2006.01) |
| *G06F 16/9535* | (2019.01) |
| *H04L 12/58* | (2006.01) |
| *H04W 4/12* | (2009.01) |

(52) U.S. Cl.
CPC ...... *H04L 67/2857* (2013.01); *G06F 16/9535* (2019.01); *H04L 29/08936* (2013.01); *H04L 51/28* (2013.01); *H04L 67/306* (2013.01); *H04M 3/387* (2013.01); *H04L 51/10* (2013.01); *H04L 51/32* (2013.01); *H04M 2203/655* (2013.01); *H04W 4/12* (2013.01)

(58) Field of Classification Search
CPC ............... H04L 67/2857; H04L 67/306; H04L 67/2819; H04L 67/30; H04L 29/08936; H04L 51/10; H04M 3/387; H04W 4/12; G06F 16/9535
USPC ........................................................ 709/203
See application file for complete search history.

(56) References Cited

U.S. PATENT DOCUMENTS

| | | | | |
|---|---|---|---|---|
| 2011/0119258 | A1* | 5/2011 | Forutanpour | G06Q 10/107 707/723 |
| 2011/0191433 | A1* | 8/2011 | Du | G06F 15/16 709/206 |
| 2011/0252340 | A1* | 10/2011 | Thomas | G06Q 10/107 715/756 |
| 2012/0196581 | A1* | 8/2012 | Papakipos | H04L 51/046 455/415 |
| 2013/0129064 | A1* | 5/2013 | Daigle | H04M 1/274575 379/142.02 |

(Continued)

Primary Examiner — Ruolei Zong
(74) Attorney, Agent, or Firm — Keller Jolley Preece

(57) ABSTRACT

This disclosure covers methods, non-transitory computer readable media, and systems that analyze a previously unrecognized communication number associated with a sender of a direct digital message when a client device receives the direct digital message from the previously unrecognized communication number. Based on this analysis, the methods, non-transitory computer readable media, and systems provide profile information associated with the communication number for the client device to present together with the direct digital message. To find relevant profile information for the communication number, the disclosed methods, non-transitory computer readable media, and systems optionally query a social networking system for profile information connected to the communication number.

20 Claims, 14 Drawing Sheets

(56) References Cited

U.S. PATENT DOCUMENTS

| | | | |
|---|---|---|---|
| 2014/0108579 A1* | 4/2014 | Niu | H04L 51/046 |
| | | | 709/206 |
| 2014/0113663 A1* | 4/2014 | Ma | H04L 51/20 |
| | | | 455/457 |
| 2014/0297644 A1* | 10/2014 | Cheng | G06F 17/277 |
| | | | 707/737 |
| 2016/0117355 A1* | 4/2016 | Krishnamurthy | H04L 67/22 |
| | | | 707/749 |
| 2016/0232402 A1* | 8/2016 | Jiang | G06F 21/00 |

* cited by examiner

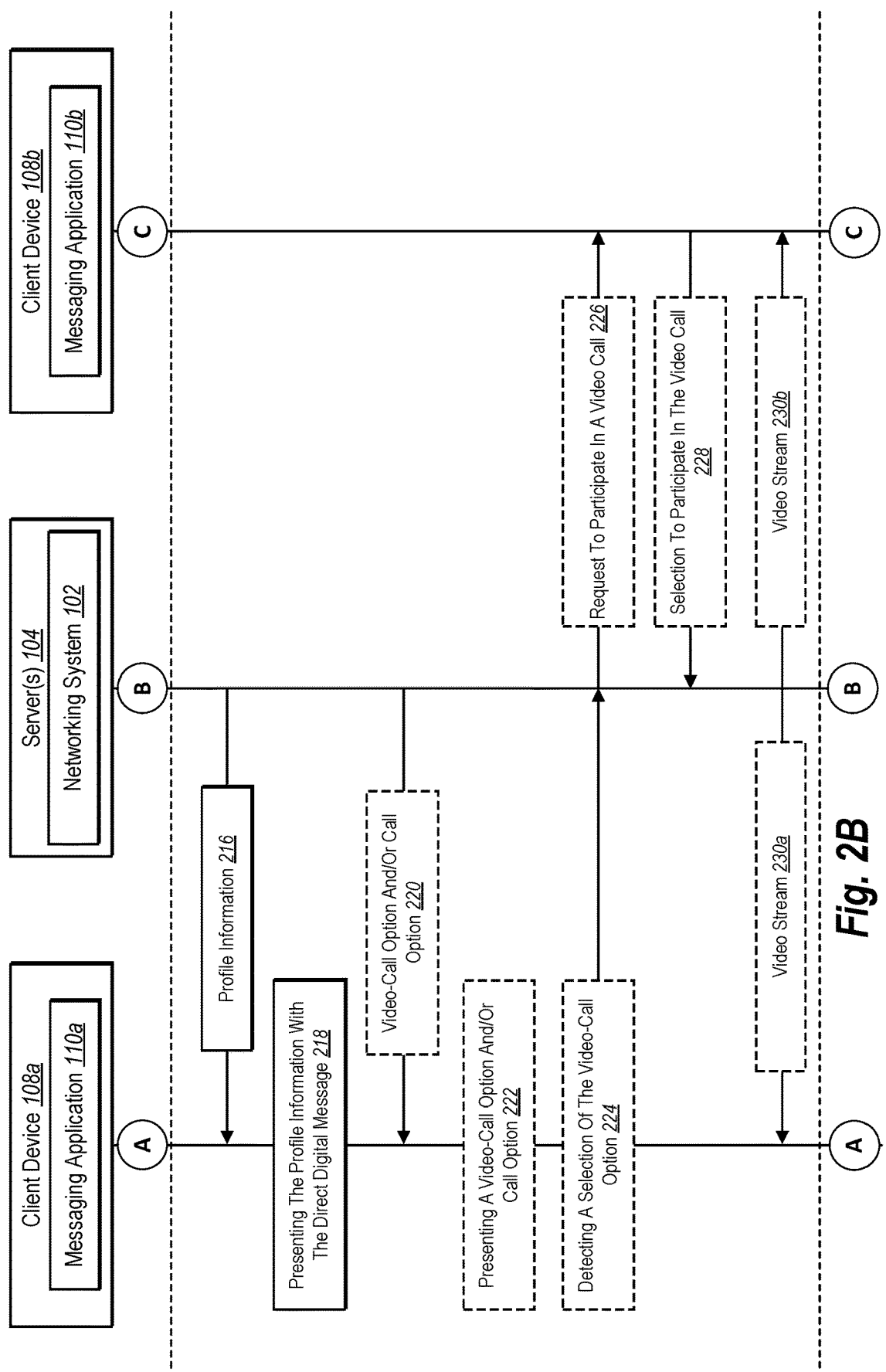

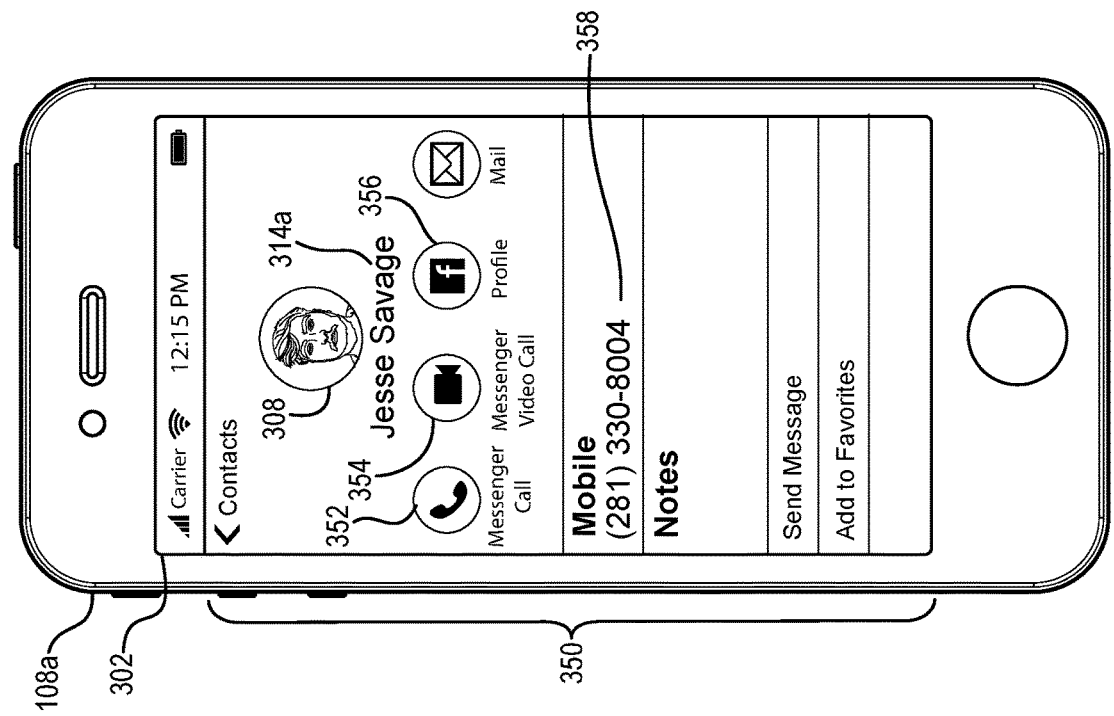
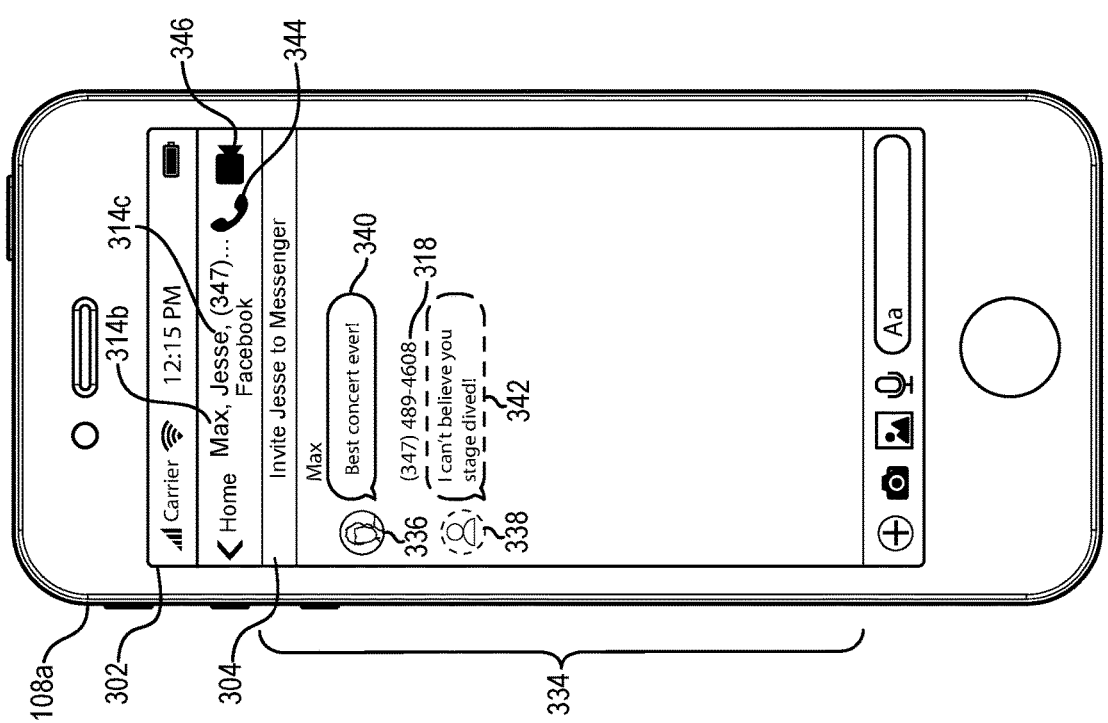
Fig. 3D
Fig. 3C

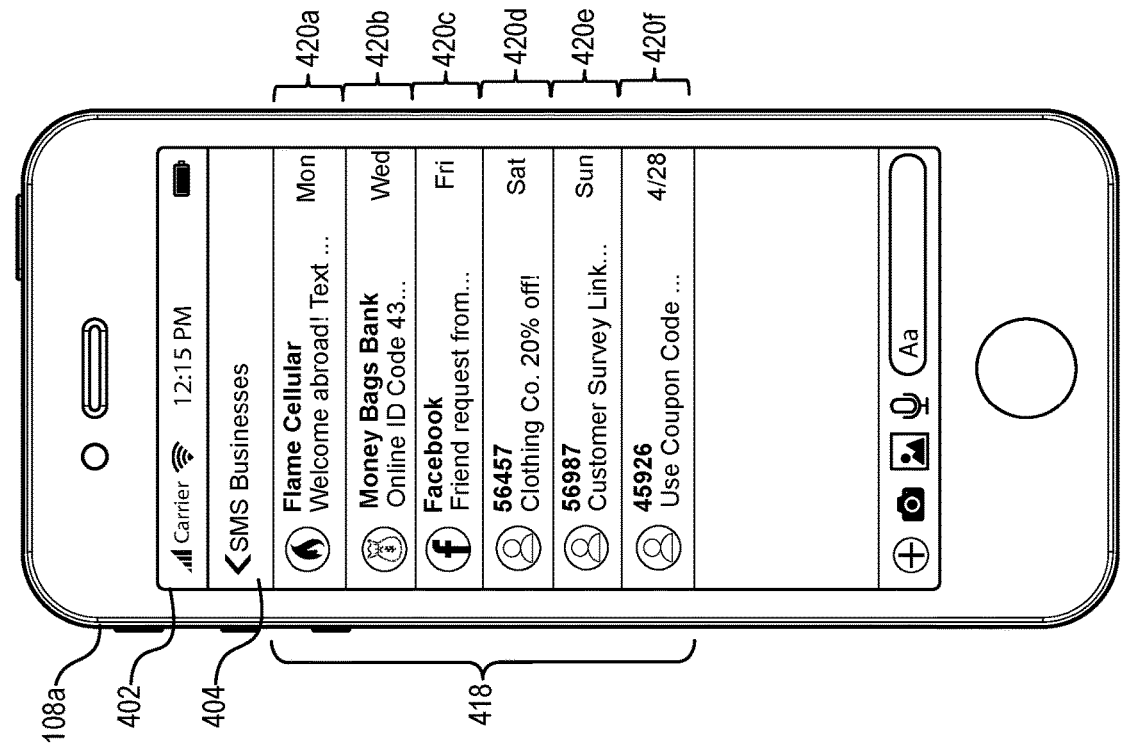
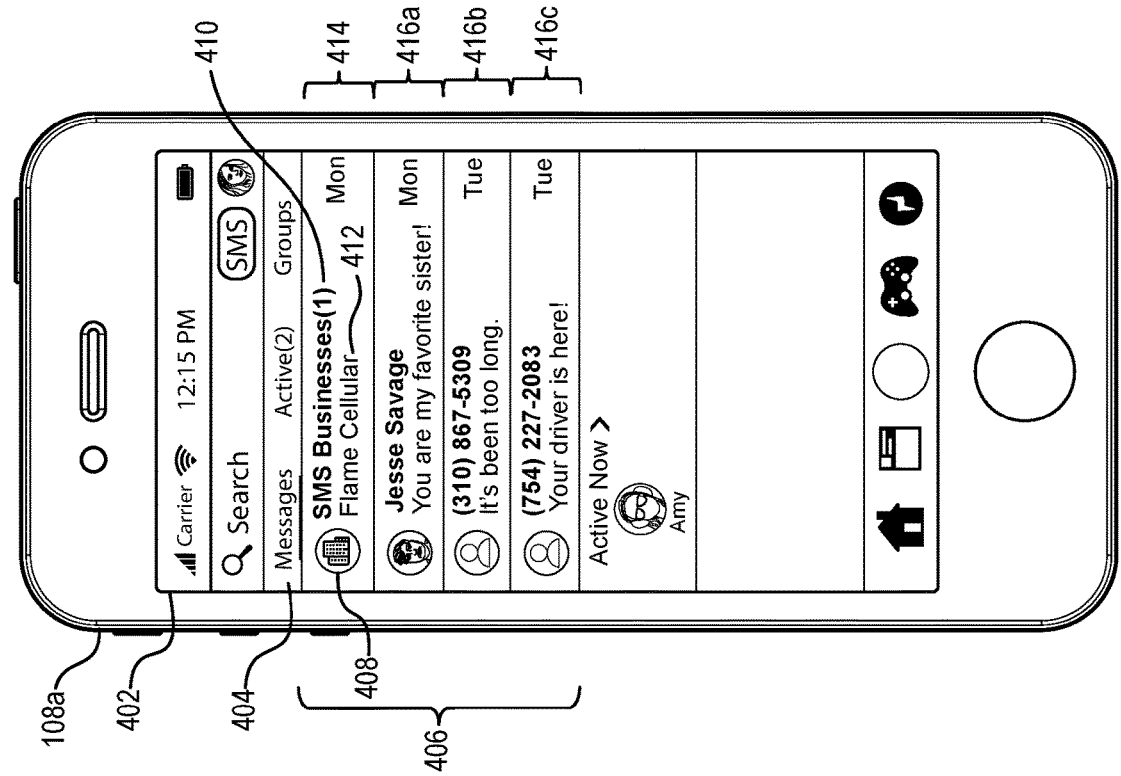
Fig. 4A
Fig. 4B

IDENTIFYING PROFILE INFORMATION OF SENDERS OF DIRECT DIGITAL MESSAGES

BACKGROUND

Network users send and receive a variety of electronic messages through different communication mediums. Mobile telephone users, for example, frequently exchange Short Message Service ("SMS")—and Multimedia Messaging Service ("MMS"). As SMS, MMS, and other electronic messages have proliferated, some users have electronic messages to perpetrate cyber fraud or engage in cyber phishing. Some existing messaging systems, for example, allow network users to create accounts using a communication number (e.g., a phone number or short code) without a name or allow for use of a pseudonym other than the user's legal name. This kind of registration can provide insufficient context for a recipient of an electronic message to identify and confidently communicate with the sender. Regardless of the type of registration offered, some existing messaging systems lack proper security checks for a user's identity and risk people or software bots sending an electronic message from an unidentified phone number or short code—with the message purporting to come from a person or organization.

Given these security vulnerabilities, organizations and individuals may inadvertently respond to electronic messages from unrecognized communication numbers, fictitious users, or false accounts. Conversely, organizations and individuals may ignore electronic messages from unrecognized communication numbers. In other words, network users are more likely to be suspicious of (and not respond to) electronic messages from an unrecognized communication number.

In addition to such cyber security risks, some existing messaging systems limit the senders and recipients to or from whom a user can send or receive electronic messages. In some cases, for instance, existing messaging systems limit users to sending or receiving electronic messages to or from other users with whom they have established a connection through a messaging or social networking system (e.g., by an invitation and acceptance to connect through a social networking system). This connection-dependent communication has several advantages—it controls the volume of electronic messages received by a user in a received-messages storage and limits the universe of potential senders or recipients who may exchange electronic messages with a particular user. But the connection-dependent communication also inhibits a user from exchanging electronic messages with persons or organizations that have not connected with the user through a messaging system or social networking system. To control unsolicited messages, for example, some existing messaging systems sequester electronic messages into a sequestration folder when the sender of the electronic message is not connected to the recipient (e.g., the sender and recipient are not friends or otherwise connected through the messaging system).

In addition to such limits on senders and recipients, some existing messaging systems lack a capability for users to communicate with non-users of the messaging system or other users to whom the users are not connected through the messaging system. For example, a messaging system may lack a workflow for users to communicate with non-users of the messaging system through additional communication mediums offered by more advanced messaging systems. Consequently, some users currently use a messaging application for one messaging system to send electronic messages and another messaging application for another messaging system to, for example, initiate a video conference for communications between the same persons or organizations.

In sum, some existing messaging systems are susceptible to cyber fraud or phishing—and provide little context to recipients—by relaying electronic messages with only a phone number, short code, or other communication number or, alternatively, a fictitious name. Additionally, some existing messaging systems lack workflows for messaging applications to engage persons outside of (or not connected within) the messaging system in additional communication mediums beyond electronic messages.

SUMMARY

This disclosure describes one or more embodiments of methods, non-transitory computer readable media, and systems that solve one or more of the foregoing or other problems in addition to providing other benefits. While this summary refers to systems for simplicity, the summary also applies to certain disclosed methods and non-transitory computer readable media. To solve the foregoing and other problems, when a client device receives a direct digital message from a previously unrecognized communication number, the disclosed systems analyze the communication number associated with the direct digital message's sender and map the communication number to profile information. Based on this analysis, the systems provide profile information associated with the communication number for the recipient device to present together with the direct digital message.

In some embodiments, for instance, the systems receive a direct digital message together with a sender communication number that is associated with the direct digital message's sender. Upon receipt of the direct digital message, the disclosed systems determine that the sender communication number does not correspond to contact information stored on the client device. This lack of contact information prompts the systems to query a networking system for profile information associated with the sender communication number. Upon receiving the profile information from the networking system, the disclosed systems use a messaging application to present the profile information together with the direct digital message.

As another example, in some embodiments, the disclosed systems receive a sender communication number from a client device. The sender communication number is associated with a direct digital message that a sender addressed to a recipient communication number. By contrast, the recipient communication number is associated with a first account of a networking system. After receiving the sender communication number, the disclosed systems search profiles of the networking system for the sender communication number and identify a second account of the networking system that is associated with the sender communication number. Having identified the second account, the disclosed systems provide profile information associated with the second account to the recipient device for presentation with the direct digital message using a messaging application.

By providing profile information for an account linked to a sender communication number, the disclosed systems provide and present an identity for the person or organization who sent an unidentified direct digital message. This sourced identification generates a profile linked to a communication number that may otherwise be unrecognizable. The identification also guards against cyber fraud and phishing with a reliable cyber identity sourced to a networking system. In some embodiments, matching the profile information with the sender communication number triggers the disclosed systems to provide additional communication functionalities available from a messaging application, such as providing options for video calls and voice-over-internet-protocol ("VoIP") calls with the sender.

BRIEF DESCRIPTION OF THE DRAWINGS

The detailed description refers to the drawings briefly described below.

FIGS. 2A-2C illustrate a sequence-flow diagram of providing profile information for a previously unrecognized communication number associated with a person or organization who sent a direct digital message in accordance with one or more embodiments.

FIGS. 3A-3D illustrate user interfaces of a client device presenting profile information for previously unrecognized communication numbers together with direct digital messages and selectable options for a video call or VoIP audio call with senders of direct digital messages in accordance with one or more embodiments.

FIGS. 4A-4B illustrate user interfaces of a client device presenting, within a folder for direct digital messages from organizations, direct digital messages received from organizations and profile information for organizations associated with previously unrecognized communication numbers in accordance with one or more embodiments.

DETAILED DESCRIPTION

Figure 1:
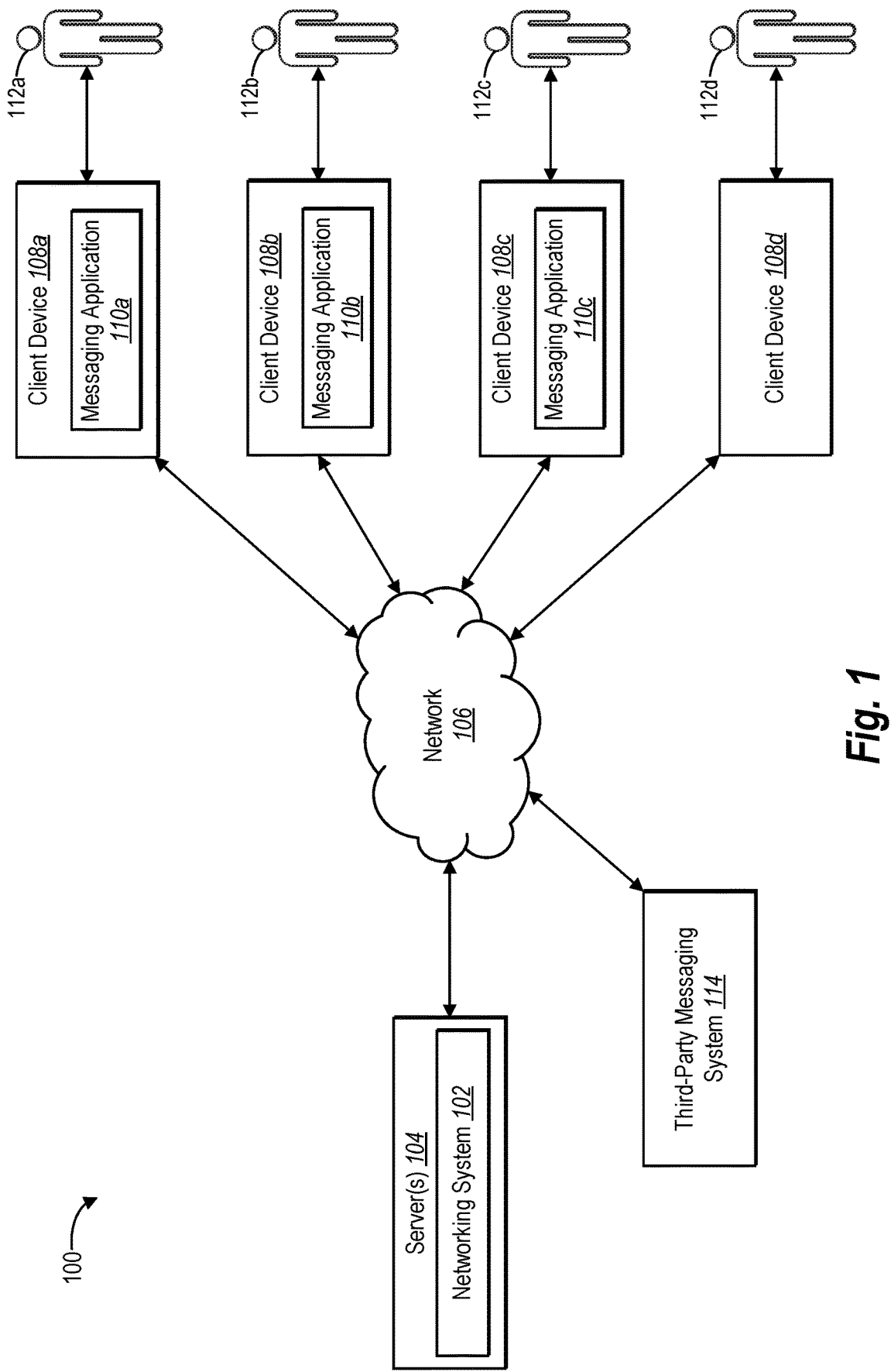
FIG. 1 illustrates a block diagram of an environment for implementing a networking system in accordance with one or more embodiments.

As described in this disclosure, when a client device receives a direct digital message from a previously unrecognized communication number, one or more embodiments of a networking system analyze the previously unrecognized communication number and map the number to profile information for the sender of the direct digital message. Based on this analysis, the networking system provides profile information associated with the communication number for the client device to present with the direct digital message.

In some embodiments, for instance, the networking system receives a direct digital message together with a sender communication number that is associated with the direct digital message's sender. Upon receipt of the direct digital message, the networking system determines that the sender communication number does not correspond to contact information stored on the client device. This lack of contact information prompts the networking system to query for profile information associated with the sender communication number. Upon receiving the profile information, the networking system uses a messaging application to present the profile information together with the direct digital message.

As another example, in some embodiments, the networking system receives a sender communication number from a client device. The sender communication number is associated with a direct digital message that a sender addressed to a recipient communication number. By contrast, the recipient communication number is associated with a first account of a social networking system. After receiving the sender communication number, the networking system searches a profile storage for the sender communication number and identifies a second account of the networking system that is associated with the sender communication number. Having identified the second account, the networking system provides profile information associated with the second account to the client device for presentation with the direct digital message using a messaging application.

In some embodiments, the social networking system also determines that the second account (i.e., the sender's account) is an account for an organization, such as a corporation, non-profit organization, or educational institution. For instance, the networking system may identify an account setting that identifies the second account as an organization. Having identified the second account as belonging to an organization, the networking system optionally provides (to a client device) profile information associated with the second account and an indicator that the second account is an organization. Upon receipt, in some embodiments, the client device uses a messaging application to present the profile information with a direct digital message from the organization within a folder for direct digital messages from organizations.

In addition to identifying and providing profile information, in some embodiments, the networking system also provides options within a messaging application for additional communication functionalities. For example, having identified a profile for the sender of a direct digital message, the networking system optionally provides the client device a video-call option for the recipient of the direct digital message to initiate a video call with the sender associated with the second account. As another example, the networking system optionally provides the client device a call option for the recipient of the direct digital message to initiate a VoIP audio call with the sender associated with the second account.

Beyond providing additional communication functionalities through a messaging application, the disclosed networking system also provides novel workflows for a user to use a messaging application to communicate with persons or organizations who are not connected to the user or who do not have an account of the networking system. For example, in some embodiments, the networking system receives a new communication number and a device identifier from a client device that downloaded an instance of the messaging application. The networking system then optionally adds the new communication number to a directory such that other client devices can initiate video calls and VoIP audio calls addressed to the new communication number by entering the new communication number into the messaging application.

As another example, in some embodiments, the networking system receives a request from a client device through a messaging application to initiate a video call addressed to a new communication number. After determining that the new communication number does not correspond to an account of the networking system, the networking system sends a real-time-communication link to an additional client device associated with the new communication number. Once selected, this real-time-communication link directs the additional client device to a website or application that facilitates a video call.

As noted above, some existing messaging systems relay direct digital messages with only a phone number, short code, or other communication number as an indication of the messages' source. Because the communication number does not include an identity of the sender, some existing messaging systems place their users at risk of cyber fraud or phishing. The disclosed networking system solves this cyber-security problem by identifying profile information for the sender. By providing the profile information, the networking system provides and presents an identity for the person or organization who sent the direct digital message. This sourced identification allows for generation of a profile linked to a communication number that may otherwise be unrecognizable.

As also noted above, some existing messaging systems lack workflows for messaging applications to engage with persons outside of (or not connected within) the messaging system using additional communication mediums beyond direct digital messaging. The disclosed networking system solves this digital-messaging-protocol problem by identifying an account connected to a sender communication number within a profile storage, such as a social graph. This matching of account to sender communication number enables users to utilize a larger offering of communications through a messaging applications. Specifically, the identity matching enables users to employ additional communication functionalities of a messaging application to communicate with a previously unidentified sender of the direct digital message, such as by using the messaging application's live-video or VoIP audio call functions.

Turning now to the figures, FIG. 1 illustrates a block diagram of one embodiment of a system environment 100 in which a networking system 102 operates. As illustrated in FIG. 1, the system environment 100 includes the networking system 102 implemented by one or more server(s) 104. The system environment 100 further includes client devices 108a-108d. As depicted in FIG. 1, each of the client devices 108a-108d have an associated user—with a user 112a associated with the client device 108a, a user 112b associated with the client device 108b, a user 112c associated with the client device 108c, and a user 112d associated with the client device 108d. The users 112a-112d may be persons, organizations, or other entities. Although FIG. 1 illustrates a particular number of client devices 108a-108d and a particular number of associated users 112a-112d, the system environment 100 may include any number of client devices and any number of associated users.

As further shown in FIG. 1, the system environment 100 includes a third-party messaging system 114. In some embodiments, the third-party messaging system 114 comprises a cellular data network with base stations and cell towers. In such embodiments, the base stations and cell towers relay Multimedia Messaging Service ("MMS") messages and Short Message Service ("SMS") messages. Additionally, or alternatively, in some embodiments, the third-party messaging system 114 comprises severs, MMS gateways, and/or SMS gateways. As the components of the third-party messaging system 114 suggest, the third-party messaging system 114 uses base stations, cell towers, servers, and/or gateways to relay direct digital messages to and from the client devices 108a-108d.

As used in this disclosure, the term "direct digital message" refers to a digital message that is sent directly (or pushed) to a recipient's account or client device. For example, a direct digital message includes an instant message, MMS message, or SMS message. A direct digital message is not and does not include electronic mail or email. To illustrate the idea of a direct digital message, in some embodiments, the data packets that constitute a direct digital message are pushed to the recipient's client device without a corresponding request (or pull) from the recipient's client device. Additionally, in certain embodiments, a direct digital message is not only directly sent (or pushed) to a recipient's client device, but it is simultaneously sent to a server for addition to a messaging thread.

The term "messaging thread" refers to a collection of one or more direct digital messages exchanged between (or among) users of a messaging system or a networking system. Accordingly, a messaging thread may include multiple direct digital messages sent exclusively between users. But a messaging thread may likewise include a single direct digital message sent exclusively from one user to another user. In some embodiments, a messaging thread is a "group messaging thread" comprising a collection of direct digital messages exchanged among a group of three or more users of a messaging system or a networking system. In certain embodiments, the client devices 108a-108c present graphical user interfaces that include messaging threads, such as the messaging threads shown in FIGS. 3B and 3C described below.

When the third-party messaging system 114 sends a direct digital message to or from the client devices 108a-108d, the third-party messaging system 114 optionally sends an accompanying communication number that indicates the source of the direct digital message. The term "communication number" refers to a number or code assigned to a particular communication device or organization for communication of direct digital messages. For example, a communication number includes a telephone number assigned to a particular telephone or mobile device that sends or receives direct digital messages. As another example, a communication number also includes a short code assigned to a computing device or organization for MMS or SMS messages. In some embodiments, the short code includes not only numbers, but may also include letters or other characters.

Relatedly, the term "sender communication number" or "sender's communication number" refers to the communication number associated with a user or organization that sent a direct digital message. For example, a sender communication number includes a communication number assigned to a client device from which a direct digital message was sent by a person or organization. By contrast, the term "recipient communication number" or "recipient's communication number" refers to the communication number associated with a user or organization that received a direct digital message. For example, a recipient communication number includes a communication number assigned to a client device that received a direct digital message. In some embodiments, the third-party messaging system 114 receives a direct digital message (e.g., an MMS or SMS message) that is associated with a sender communication number and that is addressed to a recipient communication number. The third-party messaging system 114 then directly sends or pushes the direct digital message to the client device associated with the recipient communication number.

After receiving a direct digital message, in some instances, the client devices 108a-108d present the direct digital message respectively to the users 112a-112d—with a sender communication number and/or contact information corresponding to the sender communication number. For example, upon receiving a direct digital message, the client device 108d may both determine that a sender communication number corresponds to contact information stored on the client device 108d. Upon making that determination, the client device 108d may present some or all of the contact information with the direct digital message within a graphical user interface. The term "contact information" refers to information concerning a person or organization that is both stored on a client device and that is associated with a communication number. Contact information may include, for example, a name of a person or organization and an image for the person or organization associated with a communication number. Additionally, contact information may include a birthdate, email address, physical address, job title, website, or biographical information for a person or organization associated with a communication number.

By contrast, in some instances, after receiving a direct digital message, a client device may determine that the sender communication number does not correspond to contact information stored on the client device. In some embodiments, this determination triggers use of a messaging application from the networking system 102. In contrast to the client device 108d, the client devices 108a-108c respectively include messaging applications 110a-110c from the networking system 102. When the client devices 108a-108c determine that a sender communication number does not correspond to contact information, the messaging applications 110a-110c each include instructions that, when executed by a computing device, respectively cause the client devices 108a-108c to query the networking system 102 for profile information associated with the sender communication number. The client device 108d does not perform this function because it does not include a messaging application from the networking system 102.

As used in this disclosure, the term "profile information" refers to information concerning a person or organization maintained by a networking system. Accordingly, profile information may include information concerning a person, business, corporation, or other organization. In some cases, the profile information includes and is associated with a communication number. For example, profile information may include a name of a person or organization and an image for the person or organization that is maintained by the networking system 102 and associated with a communication number. Profile information may also include a birthdate, email address, physical address, job title, website, or biographical information for a person or organization maintained by the networking system 102.

As noted above, when one of the client devices 108a-108c determines that a sender communication number does not correspond to local contact information, one of their respective messaging applications 110a-110c causes the client device 108a or 108b to query the networking system 102 for profile information associated with a sender communication number. Accordingly, in some embodiments, the client devices 108a-108c communicate with the server(s) 104 of the networking system 102 via dedicated applications on the client devices 108a-108c—that is, via the messaging application 110a messaging application 110b.

Among other things, the messaging applications 110a-110c facilitate the presentation and exchange of direct digital messages. For example, in certain embodiments, the messaging applications 110a-110c cause the client devices 108a-108c to send or receive direct digital messages either through the networking system 102 (e.g., for instant messages) or through the third-party messaging system 114 (e.g., for MMS or SMS messages). In certain embodiments, the messaging applications 110a-110c include instructions that, when executed by the client devices 108a-108c, respectively cause the client devices 108a-108c to initiate video calls or voice over internet protocol ("VoIP") calls.

Although FIG. 1 depicts the messaging applications 110a-110c as separate and standalone applications, in an alternative embodiment, the messaging applications 110a-110c are part of social networking applications (or vice versa). Regardless of whether the messaging applications 110a-110c are separate or part of social networking applications, in some embodiments, the messaging applications 110a-110c comprise web browsers, applets, or other software applications (e.g., native applications) available to the client devices 108a-108c. Additionally, in some instances, the networking system 102 provides data packets including instructions that, when executed by the client devices 108a-108c, create or otherwise integrate messaging applications 110a-110c within an application or webpage.

In one or more embodiments, the messaging applications 110a-110c are selected as operating system defaults for receiving or processing one or more types of electronic communications. For example, the messaging applications 110a-110c can be selected as a default application for receiving direct digital messages. In one or more embodiments, the messaging applications 110a-110c are selected as the default application on the respective client device for sending or receiving direct digital messages through both the networking system 102 (e.g., for instant messages) and the third-party messaging system 114 (e.g., for MMS or SMS messages). As one non-limiting embodiment, the messaging applications 110a-110c can comprise a native networking application (e.g., FB MESSENGER, WHATSAPP) designated to electronic messages from the networking application 102 as well as direct digital messages from another communication system (such text messages received through cellular networks—i.e., MMS and SMS messages).

To facilitate user interaction with the networking system 102, the messaging applications 110a and 110b each optionally provide one or more graphical user interfaces associated with the networking system 102; receive indications of interactions of the users 112a-112c with the graphical user interfaces; and perform various requests, queries, or responses to other user input, such as presenting preview messages of direct digital messages within a received-messages preview or presenting a messaging thread within the messaging applications 110a-110c.

Figure 3B:
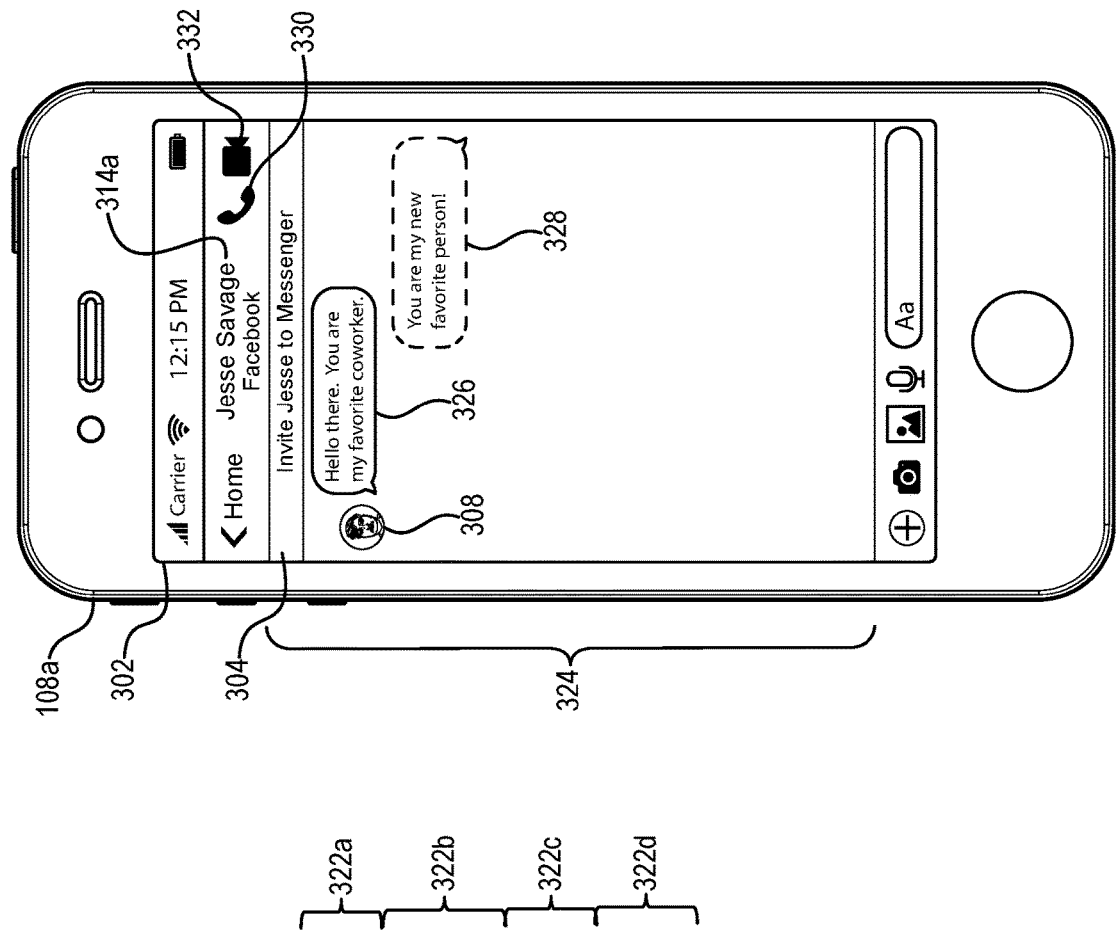
Figure 3A:
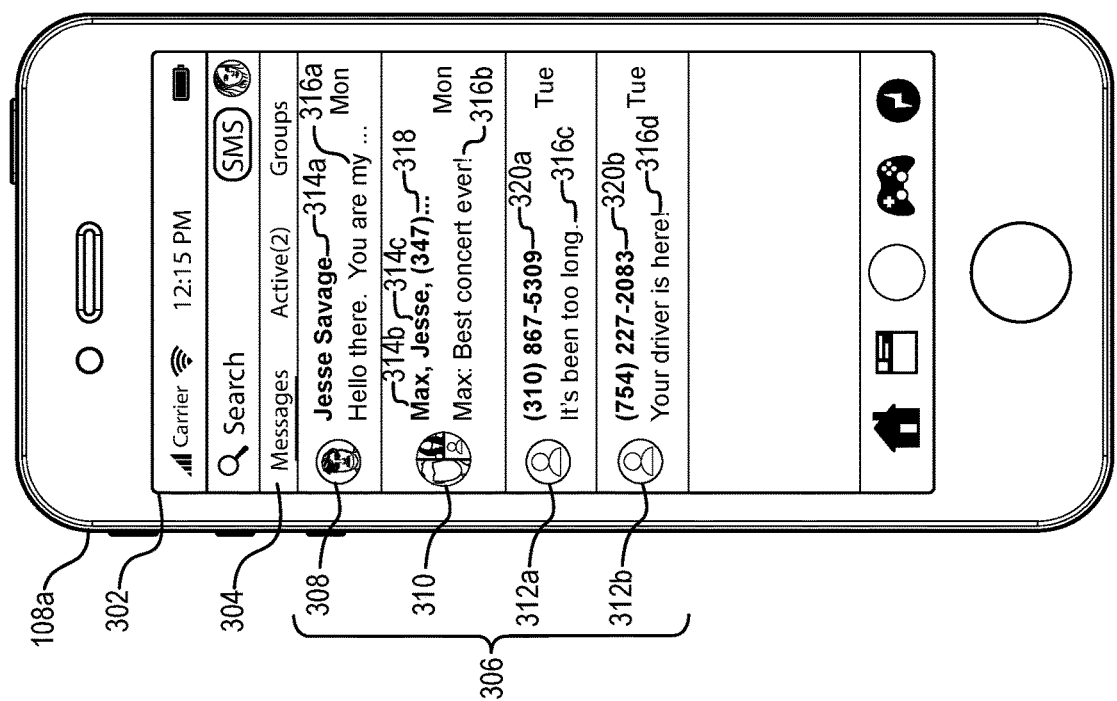

As used in this disclosure, the term "preview message" refers to a sample or snippet of a direct digital message that a client device presents as part of a push notification or received-messages preview for a received-messages storage. Relatedly, the term "received-messages preview" refers to a graphical display of received direct digital messages. FIG. 3A depicts an example of a received-messages preview and preview messages. The term "received-messages storage" refers to a storage of direct digital messages that either a networking system or client device maintains.

When sending and receiving direct digital messages, communication numbers, profile information, or other content, the client devices 108a-108d communicate over a network 106 with the networking system 102, including the server(s) 104. The networking system 102 can comprise a system that connects and allows exchange of data over a network. For example, the networking system can comprise a social networking system, a banking system, a search engine, a messaging system, an email system, etc. This disclosure describes additional details related to the one embodiment of a social networking system below with reference to FIGS. 10-11. The network 106 may represent a network or a collection of networks, such as the Internet, a corporate intranet, a local area network ("LAN"), or a combination of two or more such networks. The network 106 may also be any suitable network over which the client devices 108a-108d (or other components) access the networking system 102 (or vice versa).

As further shown in FIG. 1, the server(s) 104 can enable the various functions, features, processes, methods, and systems described in this disclosure using, for example, instructions within the networking system 102. Additionally, or alternatively, the server(s) 104 coordinate with the client devices 108a-108d to perform or provide the various functions, features, processes, methods, and systems described in more detail below. Although FIG. 1 illustrates a particular arrangement of the networking system 102, server(s) 104, network 106, client devices 108a-108d, and third-party messaging system 114, various additional arrangements are possible. For example, the networking system 102 and the server(s) 104 may directly communicate with the client devices 108a-108d and thus bypass the network 106.

Generally, the client devices 108a-108d can be any one of various types of client devices. For example, the client devices 108a-108d can be a mobile device (e.g., a smart phone), tablet, laptop computer, desktop computer, television, or any other type of computing device as further explained below with reference to FIG. 9. Similarly, the server(s) 104 can include one or more computing devices, including those explained below with reference to FIG. 9. Moreover, the server(s) 104, networking system 102, network 106, and client devices 108a-108d may communicate using any communication applications and technologies suitable for transporting data and/or communication signals, including any known communication technologies, devices, media, and protocols supportive of data communications, examples of which are described below.

As an overview of the system environment 100, the server(s) 104 provide the client devices 108a-108c access to the networking system 102 through the network 106. When the client device 108a, for example, receives a direct digital message from the client device 108b, the client device 108a optionally determines that the sender communication number that accompanied the direct digital message does not correspond to locally stored contact information. Based on instructions within the messaging application 110a, the client device 108a then sends a request to the networking system 102 for profile information associated with the sender communication number, such as a name and image of the sender of the direct digital message.

Upon receiving the request, the networking system 102 searches a profile storage for the sender communication number. Based on this search, the networking system 102 identifies an account that a profile associates with the sender communication number. In this case, the account belongs to the user 112b. Upon identifying the account, the networking system 102 accesses profile information associated with the account and sends the profile information to the client device 108a. This profile information may be a profile name and a profile image of the user 112b.

After the client device 108a receives the profile information, the client device 108a uses the messaging application 110a to present the profile information with the direct digital message. For example, the client device 108a may use the messaging application 110a to present a profile image and a profile name of the sender (i.e., the user 112b) along with a preview message (or snippet) for the direct digital message. FIG. 3A below depicts an example of the client device 108a presenting profile information with a direct digital message.

Figure 2A:
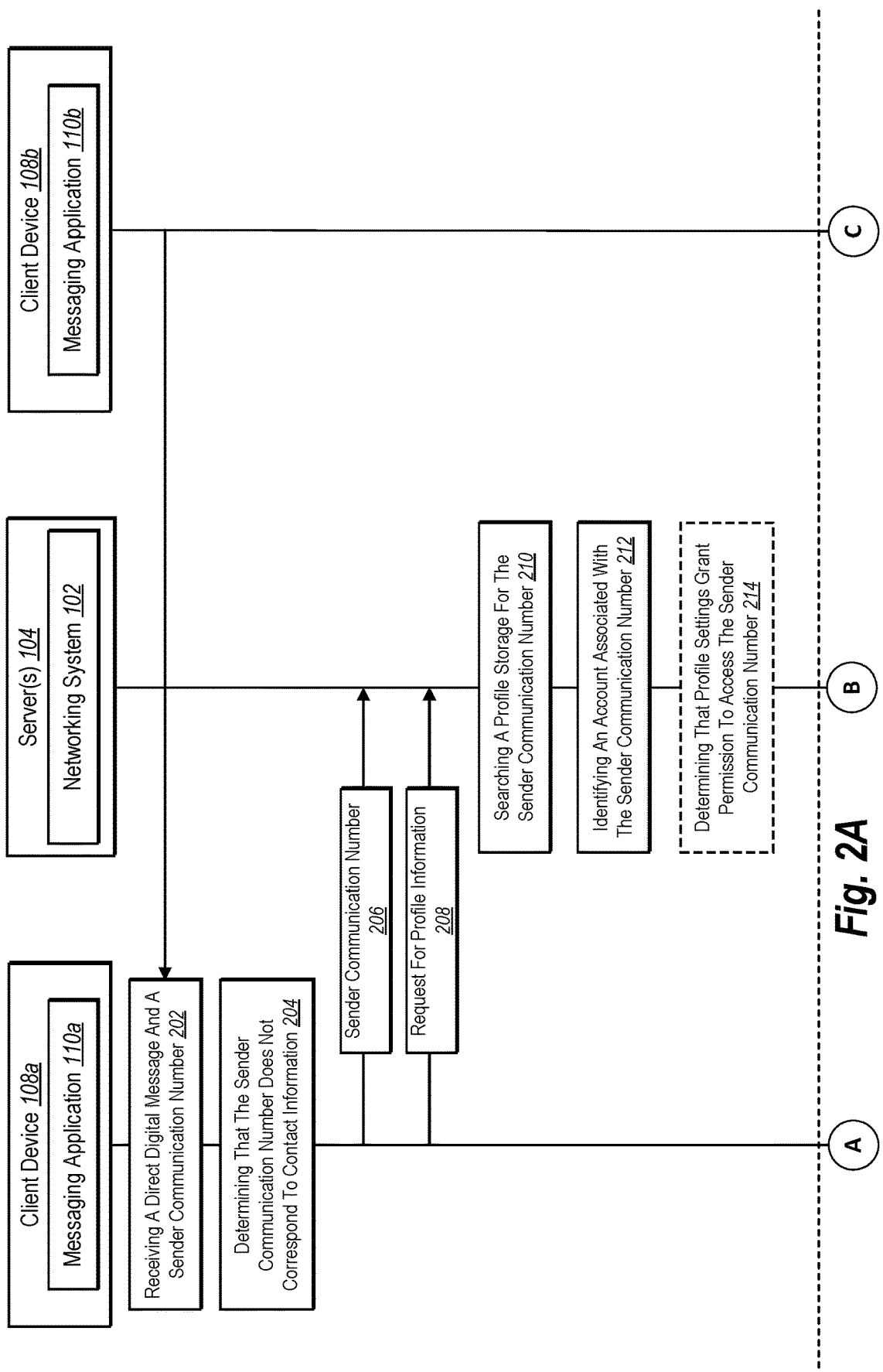
Figure 2C:
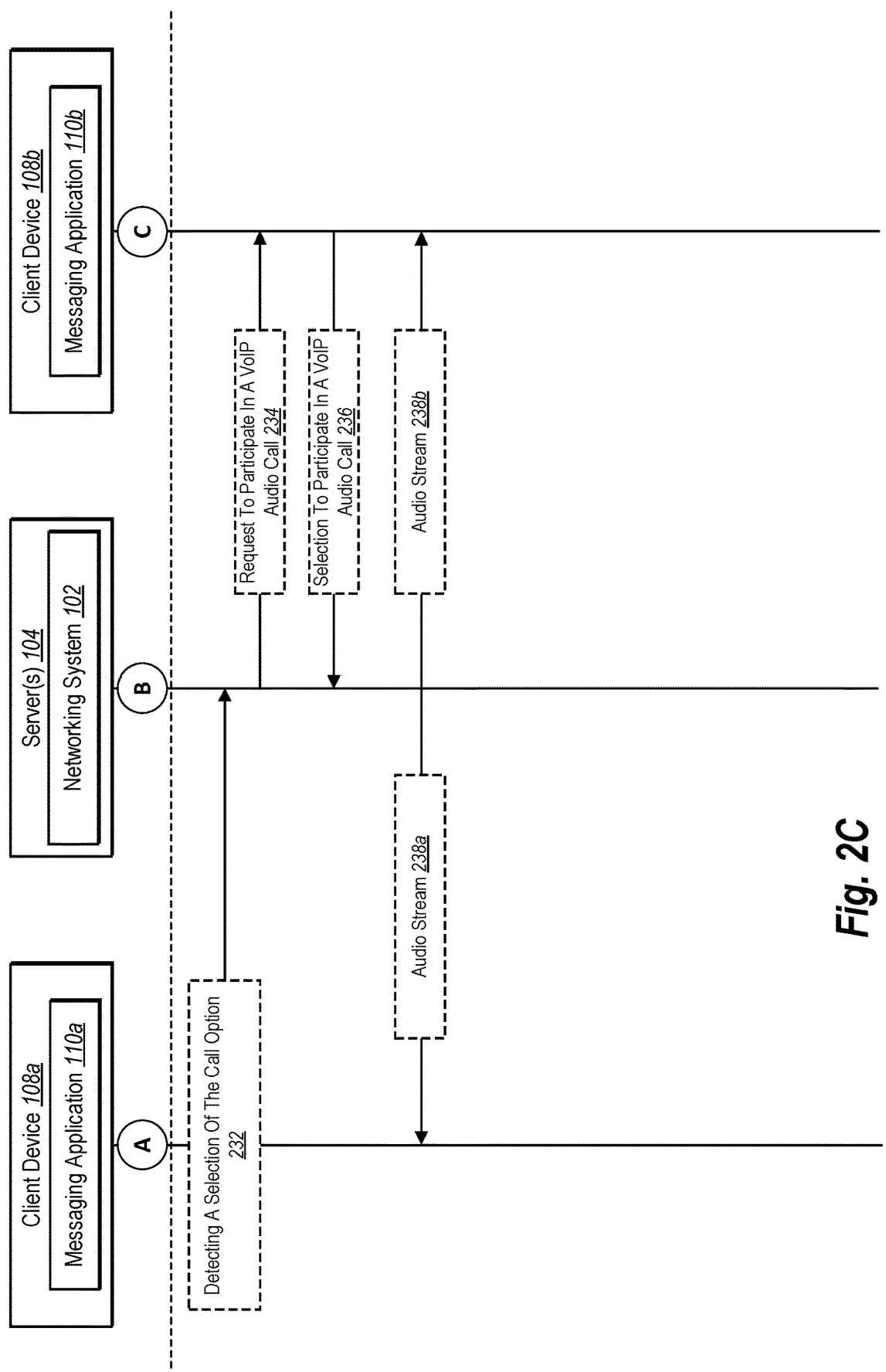

Turning now to FIGS. 2A-2C, these figures provide an overview of embodiments of the networking system 102 that provide profile information for a previously unrecognized communication number associated with a sender of a direct digital message. Specifically, FIGS. 2A-2C illustrate a representation of a sequence of acts 202-238b that the networking system 102, the client device 108a, or the client device 108b perform, such as receiving a direct digital message, sending a sender communication number and request for profile information, identifying an account associated with the sender communication number, and providing profile information.

Various components of the system environment 100 perform the acts 202-238b shown in FIGS. 2A-2C. In some embodiments, for example, the networking system 102 comprises computer-executable instructions that cause the server(s) 104 to perform one or more of the acts 202-238b. Similarly, in certain embodiments, the messaging applications 110a and 110b comprise computer-executable instructions that respectively cause the client device 108a and the client device 108b to perform one or more of the acts 202-238b. Rather than repeatedly describe the instructions within the networking system 102 as causing the server(s) 104 to perform certain acts—or the instructions within the messaging applications 110a and 110b as causing the client device 108a and client device 108b to perform certain acts—this disclosure primarily describes the networking system 102, the client device 108a, or the client device 108b as performing the acts 202-238b as a shorthand for those relationships.

Turning now to those acts, as shown in FIG. 2A, the client device 108a performs the act 202 of receiving a direct digital message and a sender communication number. For example, the client device 108a may receive an MMS or SMS message from another client device through the third-party messaging system 114. Along with the direct digital message, the third-party messaging system 114 may also send a sender communication number associated with a person or organization (or, more specifically, associated with a client device) that sent the direct digital message.

In one or more embodiments, the direct digital message is a first type of electronic message sent using a first protocol. The first protocol can comprise a protocol other than a protocol used by the networking system 102 to transmit electronic messages. Thus, in one or more embodiments, the messaging application 108a can send a second type of electronic messages to the networking system 102 (and on to other users of the networking system 102) using a second protocol that is different from the first protocol. For example, as mentioned above, the direct digital message received in step 202 can comprise an MMS or SMS message, which differs in type and protocol from Internet-based electronic messages that the networking system uses.

In one or more embodiments, the messaging application 110a is assigned or set in operating system settings to be the default application for processing/surfacing both the first type and second type of electronic messages. Thus, when an Internet-based electronic message is received at the client device 108a from the networking system 102, the messaging application 110a can process the Internet-based electronic message and surface the Internet-based electronic message via a user interface of the messaging application 108a. Similarly, when an SMS or MMS is received at the client device 108a, the messaging application 110a can process the SMS or MMS and surface the SMS or MMS via the user interface of the messaging application 110a.

Upon receiving the direct digital message, the client device 108a performs the act 204 of determining that the sender communication number does not correspond to contact information stored locally on the client device 108a. For example, in some embodiments, the client device 108a searches a local-contacts storage associated with a contacts application (or contacts book) for the sender communication number. Such a contacts application (or contacts book) includes contact information associated with communication numbers. Such contact information can include contacts entered directly into the contacts application at the client device 108a or contacts previously downloaded to the client device 108a from the networking application 102 or another communication system. In performing the search, the client device 108a optionally finds no field (or no communication-number field) within the contacts application (or contacts book) that includes the sender communication number. Having not found the sender communication number, the client device 108a determines that the sender communication number does not correspond to locally stored contact information.

After making that determination, the messaging application 110a causes the client device 108a to perform actions to identify the sender communication number with a profile from the networking system 102. Accordingly, as further shown in FIG. 2A, the client device 108a performs the act 206 of sending the sender communication number to the networking system 102 and the act 208 of sending a request to the networking system 102 for profile information associated with the sender communication number. In some embodiments, the client device 108a sends the sender communication number and the request within (or as part of) the same data packets to the networking system 102. Additionally, in some embodiments, the data packets include data indicating that the request is for profile information connected with a received direct digital message. The request also optionally specifies a type of profile information. For example, the request may specify that the networking system 102 search for a name, job title, and/or profile image associated with the sender communication number.

The request triggers the networking system 102 to search for profile information to identify the sender of the direct digital message. As further shown in FIG. 2A, after receiving the sender communication number and the request for profile information, the networking system 102 performs the act 210 of searching a profile storage for the sender communication number. As described below with reference to FIG. 11, in embodiments when the networking system 102 comprises a social networking system, the profile storage can comprise one or more social graphs. In some embodiments, a social graph includes multiple nodes and multiple edges that connect the nodes. Among other things, the social graph includes user nodes (each corresponding to a particular user and/or account) and communication-number nodes (each corresponding to a particular communication number).

Upon receiving the request for profile information, in some embodiments, the networking system 102 searches through the communication-number nodes for the sender communication number. For example, the networking system 102 may specifically search through telephone-number nodes for a telephone number (if the sender communication number is a telephone number) or through short-code nodes for a short code (if the sender communication number is a short code). By contrast, the networking system 102 may search through communication-number nodes generally for the sender communication number, whether the sender communication number be a telephone number, short code, or some other communication number.

After finding the sender communication number, the networking system 102 performs the act 212 of identifying an account associated with the sender communication number. To identify such an account, the networking system 102 analyzes the edges connected to the node that represents the sender communication number. In performing this analysis, the networking system 102 locates a node (representing an account for the user 112b) connected to the node representing the sender communication number.

For example, in some embodiments, the networking system 102 locates a node representing the sender's account by using edges within the social graph. In some such embodiments, the social graph includes edges that (a) connect communication-number nodes to user nodes and (b) indicate that a particular communication number is associated with a user node representing an account. When the user 112b inputs a communication number as part of profile information (for his or her account or an organization's account), for example, the networking system 102 creates a communication-number node representing the communication number. The networking system 102 also creates an edge that connects the communication-number node to the user node for the account of the user 112b. This edge connecting the communication-number node to the user node—or a communication-number edge—indicates that the communication number belongs to the user 112b. The communication-number edge optionally indicates that the communication number is a business, home, main, or mobile telephone number of the user 112b or, alternatively, a short code for the user 112b.

When the networking system 102 finds the communication-number node and the communication-number edge connecting the communication-number node to the user node for the user 112b, the networking system 102 follows the communication-number node to the user node for the user 112b. In other words, by identifying the communication-number edge, the networking system 102 identifies an account associated with the sender communication number. Again, in this example, the relevant account is for the user 112b because the user 112b sent the direct digital message shown in FIG. 2A from the client device 108b.

In alternative embodiments, the profile storage may not comprise a social graph. For example, in alternative embodiments, the networking system 102 maintains a database listing all of the communication numbers associated with profiles or accounts. The networking system 102 can query the database to determine if a profile or account associated with the networking system 102 includes the sender communication number.

As suggested above, when performing the act 212, the networking system 102 optionally identifies the relevant account as belonging to an organization. For example, the networking system 102 may identify the account as a particular account type. In some embodiments, account types include individual persons or organizations. In some such embodiments, account types include more specific categories for organizations, such as, but not limited to, airlines, businesses, educational institutions, financial institutions, non-profit organizations, restaurants, ridesharing companies, or telecommunication companies.

Alternatively, in some embodiments, the networking system 102 determines that the relevant user node—that is directly connected to the relevant communication-number node—is also directly connected by an edge to a node representing a profile page for an organization. By determining that the relevant user node associated with the sender communication number is connected to a profile page for an organization, the networking system 102 identifies the relevant account as belonging to an organization. Because users include persons and organizations, the networking system 102 may likewise identify the user 112b as an organization.

As further depicted in FIG. 2A, in addition to identifying an account associated with the sender communication number, the networking system 102 optionally performs the act 214 of determining that profile settings grant permission to access the sender communication number. For example, after identifying an account, the networking system 102 optionally analyzes profile settings associated with the account. Among other things, the profile settings indicate a level of accessibility for users of the networking system 102 to access a communication number associated with the account. In some embodiments, for instance, the profile settings indicate that a communication number provided by a user of the networking system 102 may be accessed or viewed by family, contacts (e.g., friends), contacts of contacts (e.g., friends of friends), followers, or the public. By contrast, in some embodiments, the profile settings indicate that a communication number provided by a user is private and may not be accessed by other users of the networking system 102.

When performing the act 214, the networking system 102 analyzes the profile settings associated with the account for the user 112b. As indicated in FIG. 2A, the networking system 102 determines that the profile settings for the user 112b's account grant the user 112a permission to access the communication number provided by the user 112b. For example, the networking system 102 may determine that the profile settings for the user 112b's account grant direct contacts permission to access the communication number and that the user 112a is a direct contact of the user 112b (e.g., a "friend"). As noted above, other permission levels—including, but not limited to, family, contacts, contacts of contacts, and public—may result in determining that the profile settings grant or forbid the user 112a permission to access the communication number provided by the user 112b.

As suggested above, in addition to identifying an account associated with a sender communication number, the networking system 102 identifies and provides profile information associated with an account to a requesting client device. As shown in FIG. 2B, the networking system 102 performs the act 216 of providing profile information. To provide such profile information, the networking system 102 accesses profile information associated with the account of the sender, which is the user 112b in the example shown in FIG. 2A.

When performing the act 216, the networking system 102 sends some or all of the profile information to the client device 108a. In some embodiments, the networking system 102 accesses and sends profile information specified by the request (e.g., a name and profile image). By contrast, in other embodiments, the networking system 102 accesses and sends profile information specified by default settings for retrieving profile information for a direct digital message (e.g., a name, job title, and profile image). Regardless of how the profile information is specified—when the networking system 102 identifies an account of the sender as an organization—the networking system 102 optionally sends profile information comprising (or together with) an indicator that the account belongs to an organization.

As further shown in FIG. 2B, upon receiving the profile information, the client device 108a performs the act 218 of presenting the profile information with the direct digital message. The client device 108a may present the profile information with the direct digital message in a graphical user interface in a variety of formats. For example, the client device 108a may present the profile information together with a preview message for the direct digital message as part of a push notification. As another example, the client device 108a may present the profile information with a preview message for the direct digital message within a graphical user interface for a received-messages preview. Additionally, or alternatively, the client device 108a may present the profile information with a messaging thread associated with the direct digital message. As described below, FIGS. 3A and 3B depict examples of the client device 108a presenting profile information with a direct digital message.

As noted above, the networking system 102 optionally provides profile information comprising (or together with) an indicator that the account belongs to an organization. This indicator triggers the client device 108a to present the direct digital message within a folder for organizations. Per computer-executable instructions of the messaging application 110a, the client device 108a presents, within a folder for direct digital messages from organizations, the profile information with the direct digital message. As described below, FIGS. 4A and 4B provide examples of such an organization-messages folder.

In the embodiments described above, the client device 108a sends the sender communication number and a request for profile information to the networking system 102—when the client device 108a determines that a sender communication number does not correspond to contact information. Alternatively, in some embodiments, when the client device 108a determines that a sender communication number corresponds to contact information, the client device 108a nevertheless sends the sender communication number and a request for profile information to the networking system 102. Indeed, in such embodiments, the client device 108a can send information in the local contact information to aid in searching for and identifying a corresponding account/profile of the networking system 102. This request may return additional profile information (or confirm the identity of) a sender. Accordingly, in some such embodiments, the networking system 102 performs the acts 210-218 above to identify an account associated with the sender communication number and provide profile information to the client device 108a for presentation with the direct digital message. Upon linking the sender communication number to an account of the networking system 102, one or more embodiments can provide the additional options/features supported by the networking system 102 that would not be available without otherwise as described in greater detail below.

By identifying an account of the networking system 102 associated with a sender communication number and providing profile information, the networking system 102 can allow for additional communication functionalities. For example, having matched a sender communication number to an account with the networking system 102, the networking system 102 can now optionally facilitate functionalities of the networking system 102 that would not have been available between the client device 108a and the sender of the MMS or SMS such as video calls and VoIP audio calls. As depicted in FIGS. 2B-2C, the networking system 102 optionally performs the acts 220-238b to enable such additional communication functionalities for the sender and recipient.

As shown in FIG. 2B, the networking system 102 performs the act 220 of providing a video-call option and/or a call option to the client device 108a. In particular, the networking system 102 can identify a client device(s) associated with the account matching the communication number having the messaging application installed thereon. The networking system 102 can optionally also determine if the messaging application is active or logged into the networking system 102. The networking system 102 can then direct any video calls or other communications provided by the networking system 102 to a client device having the messaging application in which the account matching the communication number is logged in and optionally active.

Alternatively, the networking system 102 can identify all of the client device associated with the account matching the communication number. For example, the networking system 102 can query a social graph to identify all of the nodes for client devices that are directly connected to the node for the account matching the communication number. The networking system 102 can then direct any video calls or other communications provided by the networking system 102 to all of the client devices associated with the account matching the communication number.

The client device 108a in turn performs the act 222 of presenting the video-call option and/or the call option within a graphical user interface. The term "video-call option" refers to a selectable option to initiate a video call between or among users of the networking system 102. Similarly, the term "call option" refers to a selectable option to initiate a VoIP audio call between or among users of the networking system 102. When providing such options, the networking system 102 sends an indication to the client device 108a for the messaging application 110a (or some other application) to enable or add either or both of a video-call option and a call option.

For example, in some embodiments, the networking system 102 sends an indication to the client device 108a for the messaging application 110a to add a video-call option and a call option to a graphical user interface for a messaging thread of direct digital messages between the recipient and sender (e.g., users 112a and 112b). The client device 108a in turns presents the newly added (or newly enabled) video-call option and the newly added (or newly enabled) call option within a graphical user interface for the messaging application 110a. FIG. 3B depicts an example of such a video-call option and call option.

Additionally, or alternatively, in some embodiments, the networking system 102 sends an indication to the client device 108a to add a linked video-call option or linked call option within a separate application, such as a contacts application. A linked video-call option and linked call option provide a link to the messaging application 110a and respectively initiate a video call and a VoIP audio call. After such linked options have been added, the client device 108a presents the newly added (or newly enabled) linked video-call option and the newly added (or newly enabled) linked call option within a graphical user interface for the separate application (e.g., contacts application). FIG. 3D depicts an example of such a linked video-call option and a linked call option.

As further shown in FIG. 2B, after presenting the video-call option and/or the call option, the client device 108a performs the act 224 of detecting a selection of the video-call option. The client device 108a in turn sends an indication of the detection to the networking system 102. This indication triggers the networking system 102 to then perform the act 226 of sending a request to participate in a video call to the client device 108b. Having received the request, the client device 108b presents the request within a graphical user interface of the messaging application 110b. The client device 108b then detects a selection of an option to accept the request and sends an indication of that selection to the networking system 102. By facilitating the presentation and detection of video-call options and acceptance options, the networking system 102 connects recipient and sender of a direct digital message using an additional communication functionalities—that is, here, a video call.

After the client device 108b sends an indication of the selection, the networking system 102 performs the act 228 of receiving an indication of a selection to participate in the video call. In particular, the networking system 102 receives an indication from the client device 108b that the user 112b has selected the option to accept the request to participate in the video call. As further shown in FIG. 2B, the networking system 102 then performs the act 230a of transmitting a video stream from the client device 108b to the client device 108a. Conversely, the networking system 102 also performs the act 230b of transmitting a video stream from the client device 108a to the client device 108b.

When receiving and transmitting the video streams, in some embodiments, both the networking system 102 and the client devices 108a and 108b transmit and receive data packets of audio and video using a version of Session Initiation Protocol ("SIP"). For example, in some embodiments, the networking system 102 and the client devices 108a and 108b use VoIP to transmit and receive data packets of audio and video.

Turning back now to the call option, as shown in FIG. 2C, the client device 108a performs the act 232 of detecting a selection of the call option. The client device 108a in turn sends an indication of the detection to the networking system 102. This indication triggers the networking system 102 to perform the act 234 of sending a request to participate in a VoIP audio call to the client device 108b. Having received the request, the client device 108b presents the request within a graphical user interface of the messaging application 110b. The client device 108b in turn detects a selection of an option to accept the request and sends an indication of that selection to the networking system 102. As above, by facilitating the presentation and detection of call options and acceptance options, the networking system 102 connects recipient and sender of a direct digital message using an additional communication functionalities—that is, here, a VoIP audio call.

After the client device 108b sends an indication of the selection, the networking system 102 performs the act 236 of receiving an indication of a selection to participate in the VoIP audio call. In particular, the networking system 102 receives an indication from the client device 108b that the user 112b has selected the option to accept the request to participate in the VoIP audio call. As further shown in FIG. 2C, the networking system 102 performs the act 238a of transmitting an audio stream from the client device 108b to the client device 108a. Conversely, the networking system 102 also performs the act 238*b* of transmitting an audio stream from the client device 108*a* to the client device 108*b*.

Similar to the video calls, when receiving and transmitting the audio streams, in some embodiments, both the networking system 102 and the client devices 108*a* and 108*b* transmit and receive data packets of audio using a version of SIP. For example, in some embodiments, the networking system 102 and the client devices 108*a* and 108*b* use VoIP to transmit and receive data packets of audio.

The disclosure above describes the acts 202-238*b* with reference to a sender communication number associated with a direct digital message addressed to a single recipient communication number. Alternatively, or additionally, in some embodiments, the networking system 102, the client device 108*a*, and at times other client devices perform acts to provide profile information for a previously unrecognized communication number associated with additional recipients of direct digital messages in a group messaging thread. In other words, the description and embodiments set forth above for the acts 202-238*b* also apply to acts that involve receiving additional recipient communication numbers to which a direct digital message is addressed—as part of a group messaging thread—and providing profile information associated with the additional recipient communication numbers. FIGS. 3A and 3C below provide examples of providing profile information associated with additional recipient communication numbers.

Turning now to FIGS. 3A-3D, these figures generally illustrate the client device 108*a* presenting profile information for previously unrecognized communication numbers together with direct digital messages and/or with video-call and call options. By contrast, FIGS. 4A-4B generally illustrate the client device 108*a* presenting, within a folder for direct digital messages from organizations, direct digital messages received from organizations and profile information for organizations associated with previously unrecognized communication numbers.

As suggested above, the messaging application 110*a* comprises computer-executable instructions that cause the client device 108*a* to perform tasks depicted in FIGS. 3A-3D and 4A-4B. Rather than repeatedly describe the computer-executable instructions within the messaging application 110*a* as causing the client device 108*a* to perform such tasks, this disclosure primarily describes the client device 108*a* as simply performing tasks as a shorthand for that relationship. Moreover, while this disclosure refers to touch gestures as examples of user interactions when describing FIGS. 3A-3D and 4A-4B, in additional or alternative embodiments, the client device 108*a* detects any suitable user interaction, including, but not limited to, a mouse click, stylus interaction, or a keyboard input.

Turning back now to FIG. 3A, this figure illustrates the client device 108*a* presenting a received-messages preview 306 within a graphical user interface 304 ("GUI 304") of a touch screen 302. The GUI 304 represents a home screen that the client device 108*a* presents upon opening the messaging application 110*a*. Specifically, in response to detecting a selection of a messaging-application thumbnail (not shown) by touch gesture, the client device 108*a* initiates the messaging application 110*a* and presents the GUI 304. As part of presenting the received-messages preview 306, the client device 108*a* presents profile information with preview messages for direct digital messages, as well as unrecognized sender communication numbers with preview messages for corresponding direct digital messages.

As shown within the GUI 304, the received-messages preview 306 includes messaging-thread previews 322*a*-322*d*. Each of the messaging-thread previews 322*a*-322*d* include a preview message that provides a sample of a direct digital message last added to a messaging thread. In particular, the messaging-thread previews 322*a*, 322*b*, 322*c*, and 322*d* respectively comprise preview messages 316*a*, 316*b*, 316*c*, and 316*d*. Consistent with the disclosure above, the networking system 102 provides profile information associated with the sender communication numbers—and additional recipient communication numbers in group messaging threads—associated with the direct digital messages sampled within the messaging-thread previews 322*a* and 322*b*. This disclosure describes messaging-thread previews 322*a* and 322*b* followed by the messaging-thread previews 322*c* and 322*d*.

As suggested by the components of the messaging-thread preview 322*a*, the client device 108*a* receives, through the third-party messaging system 114, a first direct digital message and a first sender communication number from the client device 108*b*. Upon receiving the first direct digital message, the client device 108*a* determines that the first sender communication number does not correspond to contact information within a local-contacts storage associated with a contacts application. In other words, the first sender communication number is an unrecognized communication number. The client device 108*a* then sends a request to the networking system 102 for profile information associated with the first sender communication number.

Consistent with the disclosure above, the networking system 102 provides profile information associated with the first sender communication number to the client device 108*a*. As shown in FIG. 3A, the client device 108*a* presents a profile image 308 and a profile name 314*a* within the messaging-thread preview 322*a*. The profile image 308 and the profile name 314*a* together identify the user 112*b* as the sender of the first direct digital message sampled within the messaging-thread preview 322*a*. In some embodiments, the client device 108*a* stores the profile image 308 and the profile name 314*a* to identify future or previous direct digital messages from the user 112*b*.

Turning back now to the messaging-thread preview 322*b*, in contrast to the messaging-thread previews 322*a*, 322*c*, and 322*d* shown in FIG. 3A, the messaging-thread preview 322*b* includes a preview message for a group messaging thread of direct digital messages. As suggested by FIG. 3A, the client device 108*a* receives, through the third-party messaging system 114, a second direct digital message and a second sender communication number from the client device 108*c*. In contrast to the first direct digital message, the second direct digital is addressed to a first recipient communication number associated with the client device 108*a*, a second recipient communication number associated with the client device 108*b*, and a third recipient communication number associated with the client device 108*d*.

As described in this disclosure, the second recipient communication number is the same communication number as the first sender communication number described above for the user 112*b*. As just noted above, the client device 108*a* optionally stores the profile image 308 and the profile name 314*a* to identify future or previous direct digital messages from the user 112*b*. But this disclosure describes searching for the second recipient communication number and providing associated profile information for explanatory purposes.

According, upon receiving the second direct digital message, the client device 108*a* determines that neither the second sender communication number, nor the second recipient communication number, nor the third recipient communication number correspond to contact information within a local-contacts storage associated with a contacts application. In other words, all three of the second sender communication number, the second recipient communication number, and the third recipient communication number are unrecognized communication numbers. The client device 108a then sends a request to the networking system 102 for profile information associated with each of the second sender communication number, the second recipient communication number, and the third recipient communication number.

After receiving the request(s), the networking system 102 searches the profile storage for the second sender communication number and the second and third recipient communication numbers. The networking system 102 identifies profiles corresponding to the second sender communication number and the second recipient communication number. By contrast, the networking system 102 does not identify a profile corresponding to the third recipient communication number. In other words, the third recipient communication number associated with the client device 108d has not match a profile within the profile storage.

Alternatively, in a different embodiment, the networking system 102 identifies a profile or account corresponding to the third recipient communication number. But the networking system 102 determines that profile settings for the corresponding account do not grant permission for the user 112a to access the third recipient communication number. Regardless of whether an account matches the third recipient communication number, the networking system 102 does not provide (to the client device 108a) profile information associated with the third recipient communication number.

By contrast, and consistent with the disclosure above, the networking system 102 provides to the client device 108a profile information associated with the second sender communication number and profile information associated with the second recipient communication number. As shown in FIG. 3A, the client device 108a presents a composite image 310 within the messaging-thread preview 322b. The composite image 310 includes a profile image for the user 112c, a profile image for the user 112b, and a placeholder image for the user 112d.

As further shown in FIG. 3A, the client device 108a presents a profile name 314b, a profile name 314c, and a recipient communication number 318 within the messaging-thread preview 322b. The profile image for the user 112c and the profile name 314a together identify the user 112c as the sender of the second direct digital message. Similarly, the profile image for the user 112b and the profile name 314c together identify the user 112b as an additional recipient of the second direct digital message. But the placeholder image and the recipient communication number 318 do not identify the user 112d beyond a communication number.

In contrast to the messaging-thread previews 322a and 322b, the networking system 102 did not identify profile information associated with sender communication numbers 320a and 320b for the direct digital messages previewed within the messaging-thread previews 322c and 322d. As FIG. 3A suggests, the client device 108a received a third direct digital message associated with the sender communication number 320a. The third direct digital message corresponds to the preview message 316c. Similarly, the client device 108a received a fourth direct digital message associated with the sender communication number 320b. The fourth direct digital message corresponds to the preview message 316d.

After respectively receiving the third and fourth direct digital messages, the client device 108a determines that neither the sender communication number 320a nor the sender communication number 320b correspond to contact information within the local-contacts storage associated with a contacts application. After making such a determination for each of the sender communication numbers 320a and 320b, the client device 108a separately sends first and second requests to the networking system 102 for profile information associated with each of the sender communication numbers 320a and 320b.

Upon receiving the first request, the networking system 102 searches the profile storage for the sender communication number 320a. Upon receiving the second request, the networking system 102 searches the profile storage for the sender communication number 320b. But when analyzing communication-number nodes, the networking system 102 does not identify an account corresponding to the sender communication numbers 320a and 320b. Accordingly, the networking system 102 does not provide profile information associated with the sender communication numbers 320a and 320b to the client device 108a.

Both the messaging-thread previews 322c and 322d of FIG. 3A reflect this lack of identity. As shown within the messaging-thread preview 322c, a placeholder image 312a and the sender communication number 320a do not identify the sender of the third direct digital message. Similarly, as shown within the messaging-thread preview 322d, a placeholder image 312b and the sender communication number 320b do not identify the sender of the third direct digital message.

Turning now to FIG. 3B, this figure illustrates a one-on-one messaging thread of direct digital messages exchanged by the client devices 108a and 108b. As shown in FIG. 3B, the client device 108a presents a messaging-thread display 324 within the GUI 304 of the touch screen 302. In response to detecting a selection of the messaging-thread preview 322a by touch gesture, the client device 108a updates the GUI 304 to include the messaging-thread di splay 324.

The messaging-thread display 324 includes a first direct digital message 326 sent from the client device 108b to the client device 108a. The first direct digital message 326 is the same as the first direct digital message described above. Having received profile information associated with the first sender communication number, the client device 108a presents the profile image 308 and the profile name 314a to identify the user 112b as the sender of the first direct digital message 326.

As further shown in FIG. 3B, the messaging-thread display 324 also includes a first replying direct digital message 328 sent from the client device 108a to the first sender communication number associated with the client device 108b. The dotted border around the first replying direct digital message 328 indicates that the client device 108a sends the first replying direct digital message 328 after presenting the received-messages preview 306 in FIG. 3A. In other words, the user 112a added the first replying direct digital message 328 sometime after viewing the received-messages preview 306.

The client device 108a also presents a call option 330 and a video-call option 332 shown in FIG. 3B. Having identified the user 112b as the sender of the first direct digital message 326, the networking system 102 provides (or sends data to the client device 108a to enable) the call option 330 as a selectable option to initiate a VoIP audio call between the users 112a and 112b. Similarly, the networking system 102 provides (or sends data to the client device 108a to enable)

the video-call option 332 as a selectable option to initiate a video call between the users 112*a* and 112*b*. Consistent with the disclosure above, in response to detecting a selection of the call option 330 or the video-call option 332, the client device 108*a* sends requests for the networking system 102 to respectively initiate a VoIP audio call or a video call between the users 112*a* and 112*b*.

Turning now to FIG. 3C, this figure illustrates a group messaging thread of direct digital messages. As shown in FIG. 3C, the client device 108*a* presents a messaging-thread display 334 within the GUI 304 of the touch screen 302. Similar to the messaging thread described above, in response to detecting a selection of the messaging-thread preview 322*b* by touch gesture, the client device 108*a* updates the GUI 304 to include the messaging-thread display 334.

The messaging-thread display 334 includes a second direct digital message 340 sent from the client device 108*c* to the client device 108*a*. The second direct digital message 340 is the same as the second direct digital message described above. In contrast to the first direct digital message 326, the second direct digital message 340 is addressed to the second recipient communication number associated with the client device 108*b* and to the recipient communication number 318 associated with the client device 108*d*.

Having received profile information associated with the second sender communication number, the client device 108*a* presents a profile image 336 and the profile name 314*b* to identify the user 112*c* as the sender of the second direct digital message 340. Similarly, having received profile information associated with the second recipient communication number, the client device 108*a* also presents the profile name 314*c* to identify the user 112*b* as an additional recipient of the second direct digital message 340.

As further shown in FIG. 3C, the messaging-thread display 334 also includes a second replying direct digital message 342 sent from the client device 108*d* to each of the client devices 108*a*, 108*b*, and 108*c*. Because the networking system 102 did not identify a communication-number node corresponding to the third recipient communication number within the social graph, the client device 108*a* does not present a profile image or profile name to identify the sender of the second replying direct digital message 342. Rather, the client device 108*a* presents a placeholder image 338 and the recipient communication number 318 to indicate that the sender of the second replying direct digital message 342 (i.e., user 112*d*) lacks corresponding contact information and profile information.

As above, the dotted border around the second replying direct digital message 342 indicates that the client device 108*a* receives the second replying direct digital message 342 after presenting the received-messages preview 306 in FIG. 3A. In other words, the user 112*d* added the second replying direct digital message 342 sometime after the user 112*a* viewed the received-messages preview 306.

As further shown in FIG. 3C, the client device 108*a* also presents a call option 344 and a video-call option 346. Having identified the user 112*c* as the sender of the second direct digital message 340—and the user 112*b* as an additional recipient of the second direct digital message 340—the networking system 102 uses its messaging applications to enable VoIP audio calls and video calls for participants of the group messaging thread. Although the networking system 102 has not identified the user 112*d* within the networking system 102, as explained below, the networking system 102 can nevertheless initiate a VoIP audio call or a video call that includes the client device 108*d*.

As for the VoIP audio call, the networking system 102 sends a VoIP audio stream through a VoIP gateway addressed to the recipient communication number 318. As one of ordinary skill in the art would recognize, a VoIP gateway can connect the client device 108*d* to a VoIP audio call with the other client devices 108*a*, 108*b*, and 108*c*. As for the video call, the networking system 102 sends a real-time-communication link to the client device 108*d* to participate in the video call. This disclosure describes the real-time-communication link below with reference to FIG. 6.

Having a method of initiating a VoIP audio call or a video call with each participant in the group messaging thread, the networking system 102 provides (or sends data to the client device 108*a* to enable) the call option 334 as a selectable option to initiate a VoIP audio call among the users 112*a*, 112*b*, 112*c*, and 112*d*. Similarly, the networking system 102 provides (or sends data to the client device 108*a* to enable) the video-call option 346 as a selectable option to initiate a video call among the users 112*a*, 112*b*, 112*c*, and 112*d*. Consistent with the disclosure above—and the description of real-time-communication links below—in response to detecting a selection of the call option 344 or the video-call option 346, the client device 108*a* sends requests for the networking system 102 to respectively initiate a VoIP audio call or a video call among the users 112*a*, 112*b*, 112*c*, and 112*d*.

As suggested by FIG. 3C, the group messaging thread includes four members: users 112*a*, 112*b*, 112*c*, and 112*d*. Some group messaging threads include additional members. In some instances, users of the networking system 102 may not want to initiate a video call of VoIP audio with every member of a group messaging thread. Indeed, in some instances, a group messaging thread may include so many members that a video call or VoIP audio that includes every member would be overcrowded. Alternatively, a group messaging thread may include members who receive or send direct digital messages, but whom a user does not want (or is unlikely) to engage in a video call or VoIP audio call.

In some embodiments, the networking system 102 addresses these problems by providing a call-participant recommendation. A call-participant recommendation suggests specific members of a group messaging thread to invite to participate in a video call of VoIP audio call. For example, in some embodiments, the networking system 102 generates a real-time-communication coefficient for each member of a group messaging thread as a precursor to generating a call-participant recommendation. The real-time-communication coefficient represents a likelihood that a member of the group messaging thread will engage in a video call or VoIP audio call with a specific user of the networking system 102 (e.g., user 112*a*).

The networking system 102 generates a real-time-communication coefficient based on a user's history of engaging with another user in a video call or VoIP audio call using the messaging application of the networking system 102. For example, in some embodiments, the networking system 102 generates a real-time-communication coefficient by calculating a number of video calls and VoIP audio calls between or among one user and another user within a time period (e.g., month, six months, year). In some embodiments, the real-time-communication coefficient is a sum of such video calls and VoIP audio calls. In other embodiments, the real-time-communication coefficient is a mean number of such video calls and VoIP audio calls in a given time period.

Alternatively, in some embodiments, the networking system 102 generates a Public Switched Telephone Network ("PSTN") coefficient for each member of a group messaging thread as a precursor to generating a call-participant recommendation. The PSTN coefficient also represent a likelihood that a member of the group messaging thread will engage in a video call or VoIP audio call with a specific user of the networking system 102 (e.g., user 112a). In contrast to the real-time-communication coefficient, however, the networking system 102 generates a PSTN coefficient based on a user's history of engaging with another user in a PSTN call using the PSTN and/or some calling application other than the messaging application of the networking system 102. To generate this PSTN coefficient, the users grants permission and the messaging application accesses a call history of a client device.

For example, in some embodiments, the networking system 102 generates a PSTN coefficient by calculating a number of PSTN calls between or among one user and another user within a time period (e.g., month, six months, year) as shown in the one user's call history. In some embodiments, the PSTN coefficient is a sum of such PSTN calls. In other embodiments, the PSTN coefficient is a mean number of such PSTN calls in a given time period.

In yet another embodiment, the networking system 102 generates and uses both a real-time-communication coefficient and a PSTN coefficient to make a call-participant recommendation. For example, in some embodiments, the networking system 102 assigns weights to and multiplies a real-time-communication coefficient and a PSTN coefficient for a specific member of a group messaging thread to generate a composite-call coefficient.

Regardless of which coefficient the networking system 102 uses, the networking system 102 provides a call-participant recommendation for a particular member of the group messaging thread when that particular member's real-time-communication coefficient, PSTN coefficient, or composite-call coefficient exceeds a threshold. For example, when the client device 108a opens the group messaging thread shown in FIG. 3C, the networking system 102 may generate a composite-call coefficient for each of the users 112a, 112b, and 112d. If any of their composite-call coefficients exceed a threshold, the networking system 102 may provide a call-participant recommendation for that user (or group of users) to the client device 108a for presentation within the GUI 304. In certain embodiments, the client device 108a may present a small thumbnail image of each users for whom the composite-call coefficient exceeds the threshold near or overlapping the call option 344 or the video-call option 346.

In addition to providing or enabling video-call and call options within graphical user interfaces of the messaging application 110a, in some embodiments, the networking system 102 additionally or alternatively adds such options to graphical user interfaces of separate software applications. FIG. 3D provides an example of adding such options to a contact display for a contacts application (not shown) separate from the messaging application 110a. As shown in FIG. 3D, the client device 108a presents a contact display 350 within a graphical user interface 348 ("GUI 348") of the touch screen 302.

The contact display 350 includes both a first sender communication number 358 and profile information imported from the messaging application 110a. The first sender communication number 358 is associated with the client device 108b. After the client device 108a receives profile information associated with the first sender communication number 358—as described above—the client device 108a adds the profile information within the local-contact storage associated with the contact application. Accordingly, the client device 108a adds the profile image 308 and the profile name 314a to a contact entry within the contact storage of the client device 108a for the first sender communication number 358.

As further shown in FIG. 3D, the client device 108a adds a linked call option 352 and a linked video-call option 354 to the contact display 350. The linked call option 352 and the linked video-call option 354 both include links to the messaging application 110a and respectively initiate a VoIP audio call and a video call through the messaging application 110a. Consistent with the disclosure above, when the client device 108a detects a user selection of the linked call option 352 and the linked video-call option 354, the client device 108a sends requests for the networking system 102 to respectively initiate a VoIP audio call or a video call between the users 112a and 112b.

In addition to the linked call option 352 and the linked video-call option 354, the client device 108a adds a link-profile option 356. The link-profile option 356 links contact information on the client device 108a with profile information from the networking system 102—if the profile information has not yet been provided. When such profile information has not been provided and the client device 108a detects a user selection of the link-profile option 356, the client device 108a associates contact information with profile information for the user 112b from the networking system 102. For example, upon selection of the link-profile option 356, the contact application causes the client device 108a to request profile information from the messaging application 110a and/or the networking system 102 for the user 112b. In response to the request, the messaging application 110a and/or the networking system 102 provide (or shares) profile information for the user 112b with the contact information, such as the profile image 308 and the profile name 314a. By contrast, when the client device 108a again detects a user selection of the link-profile option 356, the client device 108a disassociates the contact information with profile information for the user 112b from the networking system 102.

In addition to providing profile information and communication options, and as noted above, the networking system 102 optionally sends profile information comprising (or together with) an indicator that an account belongs to an organization. This indicator triggers a client device to store and present a direct digital message from the organization within a folder for direct digital messages from organizations. FIGS. 4A-4B provide an example of a folder for direct digital messages from organizations.

As shown in FIG. 4A, the client device 108a presents a received-messages preview 406 within a graphical user interface 404 ("GUI 404") of a touch screen 402. Similar to the GUI 304 in FIG. 3A, the GUI 404 in FIG. 4A represents a home screen that the client device 108a presents upon opening the messaging application 110a. As part of the received-messages preview 406, the client device 108a presents an organization-messages folder 414 and messaging-thread previews 416a-416c.

As shown within the GUI 404, the organization-messages folder 414 represents and includes a collection of direct digital messages received from organizations. As suggested above, the networking system 102 identifies sender communication numbers—that are associated with each of the direct digital messages within the organization-messages folder 414—as also associated with an organization. In some embodiments, the networking system 102 identifies such sender communication numbers as belonging to an organization by sending an indicator to the client device 108a.

Additionally, or alternatively, the networking system 102 identifies sender communication numbers as belonging to an organization through instructions within the messaging application 110a. For example, in some embodiments, the messaging application 110a includes computer-executable instructions that, when executed by the client device 108a, cause the client device 108a to identify all short codes as belonging to an organization. In such embodiments, the client device 108a presents any direct digital messages received from a client device associated with a short code within the organization-messages folder 414.

While the organization-messages folder 414 in FIG. 4A represents a collection of direct digital messages received from businesses, in alternative embodiments, an organization-messages folder may represent and include different types of organizations. For example, an organization-messages folder may represent and include direct digital messages from one or more of airlines, educational institutions, financial organizations, non-profit organizations, restaurants, ridesharing companies, telecommunication companies, or any other type of organization. In some embodiments, the client device 108a presents direct digital messages of different organizational types in different folder types (e.g., ridesharing folder, financial folder).

As further shown in FIG. 4A, the organization-messages folder 414 includes a generic organization image 408 and a folder name 410. Both the generic organization image 408 and the folder name 410 indicate that the organization-messages folder 414 includes direct digital messages associated with sender communication numbers that the networking system 102 identifies as belonging to an organization. The folder name 410 further indicates a number of unread direct digital messages from an organization within the organization-messages folder 414. In contrast to the organization-messages folder 414, the messaging-thread previews 416a-416c include preview messages for direct digital messages associated with sender communication numbers that the networking system 102 has not (or has not yet) identified as belonging to an organization.

Turning now to FIG. 4B, this figure depicts the contents of the organization-messages folder 414. In particular, in response to detecting a selection of the organization-messages folder 414 by touch gesture, the client device 108a presents a received-organization-messages preview 418 within the GUI 404 of the touch screen 402. As its name implies, the received-organization-messages preview 418 is a graphical display of direct digital messages received from organizations. The received-organization-messages preview 418 includes messaging-thread previews 420a-420f. As suggested above, the networking system 102 identifies each of the sender communication numbers—associated with the direct digital messages previewed within the messaging-thread previews 420a-420f—as belonging to an organization.

As shown in FIG. 4B, each of the messaging-thread previews 420a-420c comprise profile information associated with sender communication numbers identified by the networking system 102. Consistent with the disclosure above, the networking system 102 provides the profile information associated with each of the relevant sender communication numbers associated with the messaging-thread previews 420a-420c. Accordingly, each of the messaging-thread previews 420a-420c include a profile image and a profile name for the corresponding organization.

By contrast, the networking system 102 does not (or cannot) provide profile information associated with each of the relevant sender communication numbers associated with the messaging-thread previews 420d-420f. Accordingly, each of the messaging-thread previews 420d-420f include a placeholder image and a sender communication number for the corresponding organization. But the messaging-thread previews 420d-420f are nevertheless part of the organization-messages folder 414. In the embodiment shown in FIG. 4B, the client device 108a executes instructions within the messaging application 110a to identify all short codes as belonging to an organization.

Figure 5:
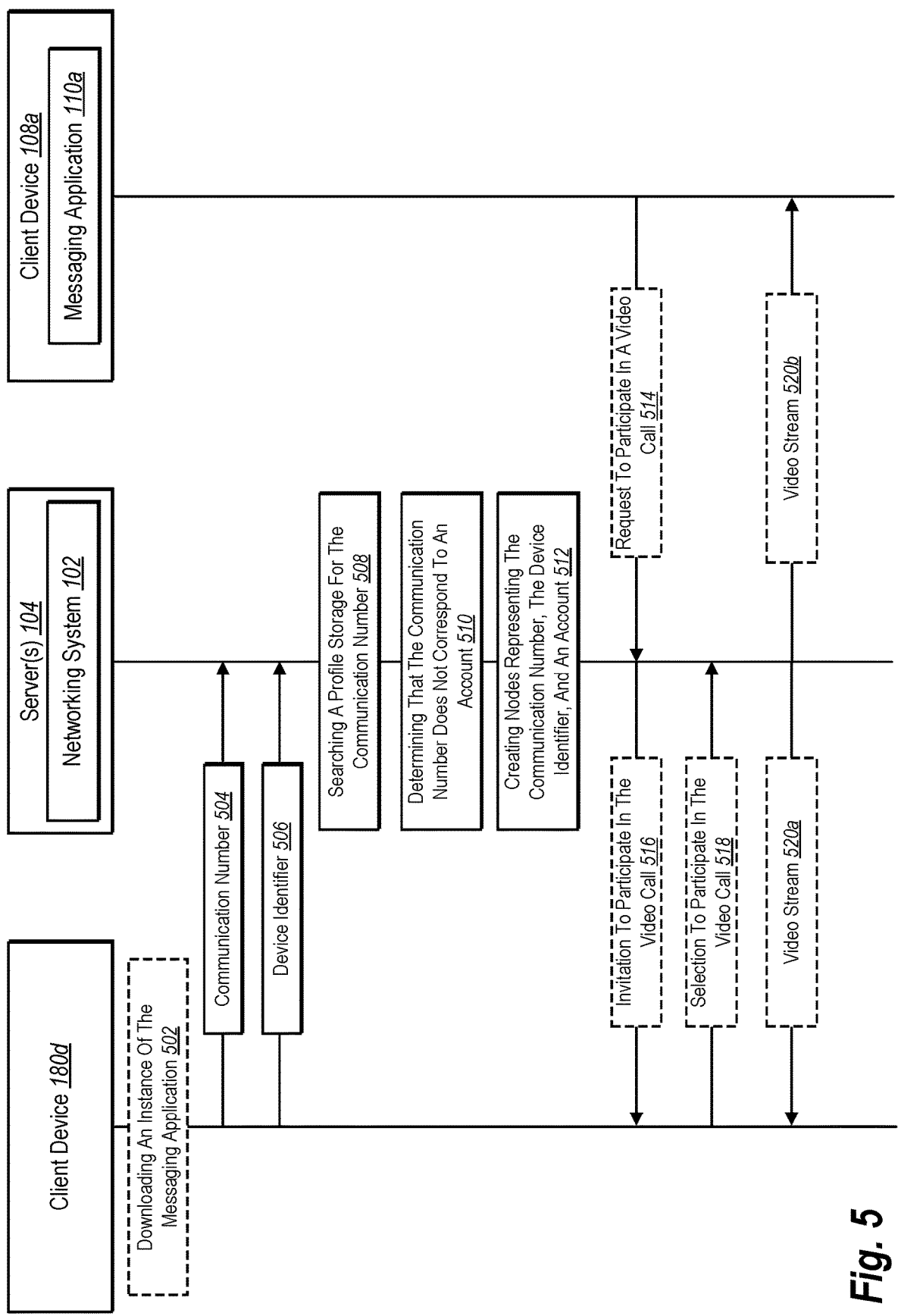
FIG. 5 illustrates a sequence-flow diagram of creating a directory of communication numbers within a profile storage in accordance with one or more embodiments.

As noted above, in some embodiments, the networking system 102 uses the social graph to create a directory of users who download the messaging application by representing new communication numbers (associated with client devices) by nodes within the social graph. FIG. 5 provides an overview of an embodiment of the networking system 102 that creates such a directory. The directory enables users of the networking system 102 who lack profile information for an account (e.g., profile image or profile name) to nevertheless communicate through the networking system 102.

FIG. 5 illustrates a representation of a sequence of acts 502-520b that the networking system 102, the client device 108a, or the client device 108d perform, such as sending a communication number and device identifier; searching a social graph for the communication number; and creating nodes representing the communication number, device identifier, and an account. Various components of the system environment 100 perform the acts 502-520b.

In some embodiments, for example, the networking system 102 comprises computer-executable instructions that cause the server(s) 104 to perform one or more of the acts 502-520b. Similarly, in certain embodiments, a newly downloaded messaging application and the messaging application 110a comprise computer-executable instructions that respectively cause the client device 108d or the client device 108a to perform one or more of the acts 502-520b. Rather than repeatedly describe the instructions within the networking system 102 as causing the server(s) 104 to perform certain acts—or the instructions within the newly downloaded messaging application and the messaging application 110a as causing the client device 108d or client device 108a to perform certain acts—this disclosure primarily describes the networking system 102, the client device 108d, or the client device 108a as performing the acts 502-520b as a shorthand for those relationships.

As shown in FIG. 5, the client device 108d performs the act 502 of downloading an instance of the messaging application. As described above with regards to FIG. 1, the client device 108d does not initially include a messaging application. For purposes of the embodiments shown in FIG. 5, however, the client device 108d downloads an instance of the messaging application from the networking system 102. In some such embodiments, the client device 108d requests data from the networking system 102 that comprise instructions to create or otherwise integrate an instance of the messaging application. Based on this request, the networking system 102 provides data packets including instructions that, when executed by the client device 108d, create or otherwise integrate an instance of the messaging application within a software application or webpage. This disclosure will refer to this downloaded instance of the messaging application as the "additional messaging application" for purposes of FIG. 5.

After downloading the additional messaging application, the client device 108d performs the act 504 of sending a communication number to the networking system 102 and the act 506 of sending a device identifier to the networking system 102. For example, in some embodiments, the client device 108d sends data packets that indicate a telephone number assigned to the client device 108d to the networking system 102. Additionally, the client device 108d sends any suitable device identifier for the client device 108d to the networking system 102, including, but not limited to, an Electronic Serial Number ("ESN"), International Mobile Equipment Identity ("MEI"), International Mobile Subscriber Identity ("IMSI"), MAC Address, Mobile Equipment Identifier ("MEID"), Secure Android ID, or Unique Device Identifier ("UDID").

Upon receiving the communication number, the networking system 102 performs the act 508 of searching a social graph for the communication number. For example, in some embodiments, the networking system 102 searches through the communication-number nodes of the social graph for the communication number associated with the client device 108d. As noted above, the networking system 102 may specifically search through telephone-number nodes for a telephone number (if the communication number is a telephone number) or through short-code nodes for a short code (if the communication number is a short code). Alternatively, the networking system 102 may search through communication-number nodes generally for the communication number, whether the communication number associated with the client device 108d be a telephone number, short code, or some other communication number.

In the embodiment shown in FIG. 5, however, the networking system 102 does not find the communication number associated with the client device 108d within the social graph. Consequently, the networking system 102 performs the act 510 of determining that the communication number does not correspond to an account. In some embodiments, having found no node representing the communication number within the social graph, the networking system 102 likewise determines that the social graph does not include a user node representing an account associated with the client device 108d. In other words, the networking system 102 determines that the communication number associated with the client device 108d is not listed within profile information for an account of the networking system 102.

In response to determining that the communication number does not correspond to an account, the networking system 102 creates an account associated with the communication number. As shown in FIG. 5, the networking system 102 performs the act 512 of creating nodes representing the communication number, the device identifier, and an account. For example, in some embodiments, the networking system 102 creates a communication-number node representing the communication number, a device node representing the device identifier, and a user node representing the new account. In some embodiments, the networking system 102 creates nodes representing the communication number, the device identifier, and an account only when a corresponding client device includes the messaging application 110a/110b. Unlike some other accounts of the networking system 102, in some embodiments, the new account does not include profile information, such as a profile image or profile name. Rather, the new account is associated with the communication number.

In addition to creating nodes for the communication number, device identifier, and the new account, the networking system 102 also connects the nodes to each other through edges. For example, an edge directly connects the communication-number node representing the communication number to the device node representing the device identifier. In some embodiments, an edge directly connects the user node representing the new account to the device node representing the device identifier. Similarly, an edge directly connects the communication-number node representing the communication number to the user node representing the new account. By connecting the communication-number node and the device node, the networking system 102 establishes a connection—a direct associated of the communication number and the client device 108d—for the networking system 102 to initiate VoIP audio calls or video calls between or among the user 112d and other users of the networking system 102.

FIG. 5 depicts the networking system 102 creating nodes representing a single communication number, a single device identifier, and a single new account. But the networking system 102 optionally repeats the same process for as many new communication numbers and device identifiers that the networking system 102 receives associated with a newly downloaded messaging application. By repeating the process, the networking system 102 creates a directory for communication numbers associated with client devices that downloaded a messaging application but lack profile information associated with many accounts of the networking system 102 (e.g., profile name).

As further shown in FIG. 5, the optional acts 514-520b provide an example of the networking system 102 using the newly created nodes associated with the client device 108d and the new messaging application to facilitate a video call. Specifically, the networking system 102 performs the act 514 of receiving a request to participate in a video call and the act 516 of sending an invitation to participate in the video call. As suggested by FIG. 5, the networking system 102 receives the request from the client device 108a for a client device associated with the communication number to participate in the video call.

In some embodiments, for instance, the request from the client device 108a identifies the communication number associated with the client device 108d. But the request lacks other identifying information (e.g., a profile name) that may facilitate communication through the messaging application 110a and the new messaging application. As suggested by FIG. 5, for example, the client device 108a may detect user input identifying the communication number associated with the client device 108d and a selection of a video-call option. Based on this user input, the client device 108a sends the request (to the networking system 102) for a client device associated with the communication number to participate in a video call.

Upon receiving the request, the networking system 102 searches the social graph for (and locates) the node representing the communication number associated with the client device 108d. The networking system 102 then follows the edge directly connecting the node representing the communication number to the node representing the device identifier. Upon locating the node representing the device identifier, the networking system 102 uses SIP and the device identifier to send data packets to the client device 108d comprising an invitation to participate in the video call.

As further shown in FIG. 5, after sending the invitation, the networking system 102 performs the act 518 of receiving an indication of a selection to participate in the video call from the client device 108d. In particular, the networking system 102 receives an indication from the client device 108d that the user 112d has selected the option to accept the request to participate in the video call. The networking system 102 then performs the act 520*a* of transmitting a video stream from the client device 108*a* to the client device 108*d*. Conversely, the networking system 102 also performs the act 520*b* of transmitting a video stream from the client device 108*d* to the client device 108*a*. In some such embodiments, the networking system 102 and the client devices 108*a* and 108*d* use SIP to transmit and receive data packets of audio and video as part of the acts 520*a* and 520*b*.

Figure 6:
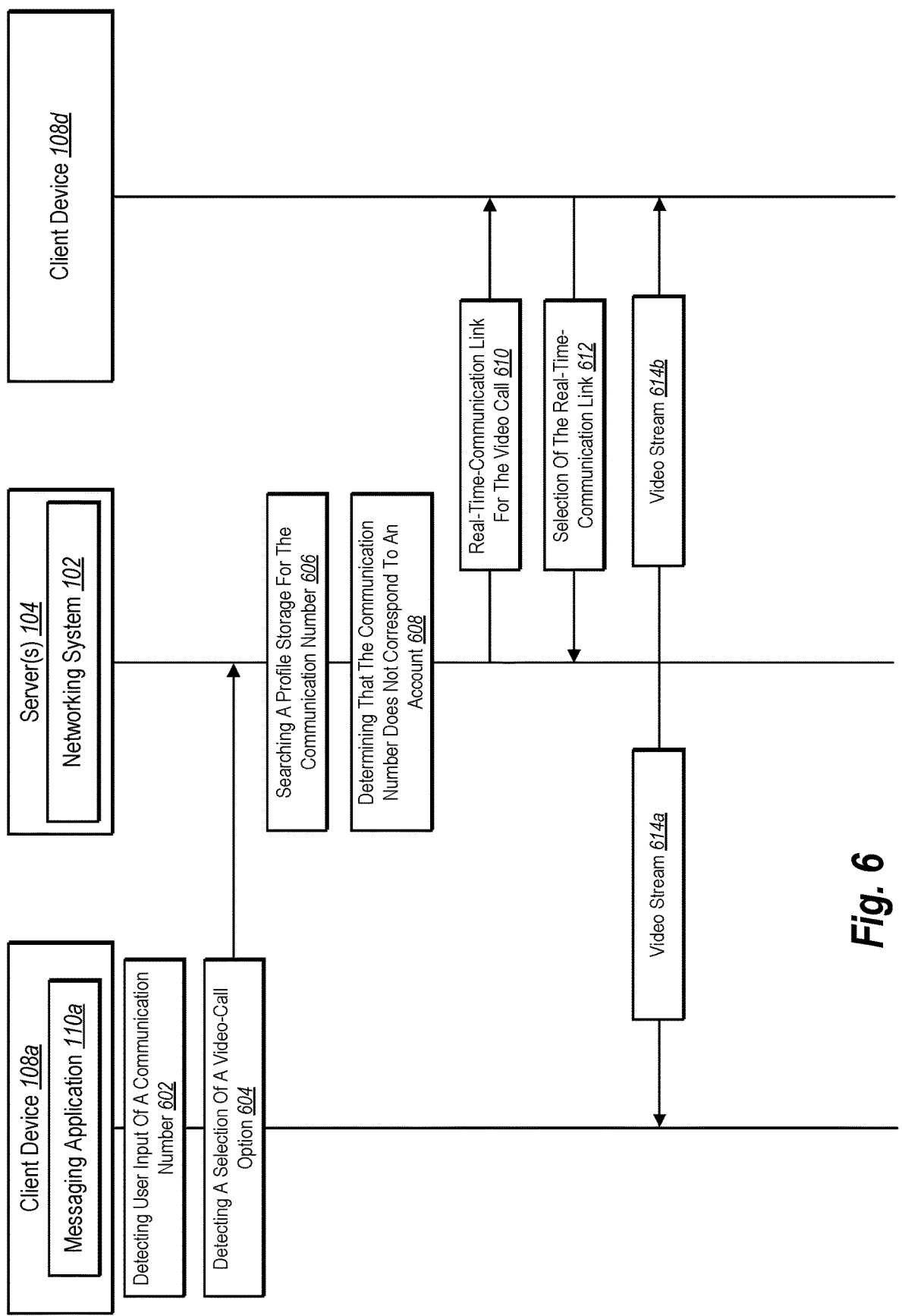
FIG. 6 illustrates a sequence-flow diagram of creating and sending a real-time-communication link for a video call to a client device without a messaging application in accordance with one or more embodiments.

In addition to creating a directory of communication numbers, and as noted above, the networking system 102 optionally uses a real-time-communication link for a user to communicate through a messaging application with persons or organizations who do not have an account of the networking system 102. FIG. 6 illustrates an embodiment of the networking system 102 creating and sending a real-time communication link to facilitate that communication. Specifically, FIG. 6 illustrates a representation of a sequence of acts 602-614*b* that the networking system 102, the client device 108*a*, or the client device 108*d* perform, such as detecting user input of a communication number, detecting a selection of a video-call option, and sending a real-time communication link for a video call.

Various components of the system environment 100 perform the acts 602-614*b*. In some embodiments, for example, the networking system 102 comprises computer-executable instructions that cause the server(s) 104 to perform one or more of the acts 602-614*b*. Similarly, in certain embodiments, the messaging application 110*a* comprises computer-executable instructions that cause the client device 108*a* to perform one or more of the acts 602-614*b*. Rather than repeatedly describe the instructions within the networking system 102 as causing the server(s) 104 to perform certain acts—or the instructions within the messaging application 110*a* as causing the client device 108*a* to perform certain acts—this disclosure primarily describes the networking system 102 or the client device 108*a* as performing the acts 602-614*b* as a shorthand for those relationships.

As shown in FIG. 6, the client device 108*a* performs the act 602 of detecting user input of a communication number and the act 604 of detecting a selection of a video-call option. In some embodiments, for example, the client device 108*a* detects user input into a graphical user interface of the messaging application 110*a*. The user input identifies a communication number of associated with the client device 108*a* and selects a video-call option to initiate a video call addressed to the communication number. Upon detecting the user input, the client device 108*a* sends a request to the networking system 102 to initiate a video call addressed to the communication number.

After receiving an indication of the request, the networking system 102 performs the act 606 of searching a social graph for the communication number. For example, in some embodiments, the networking system 102 searches through the communication-number nodes of the social graph for the communication number associated with the client device 108*d*. As noted above, the networking system 102 may specifically search through telephone-number nodes for a telephone number (if the communication number is a telephone number) or through short-code nodes for a short code (if the communication number is a short code). Alternatively, the networking system 102 may search through communication-number nodes generally for the communication number, whether the communication number associated with the client device 108*d* be a telephone number, short code, or some other communication number.

The networking system 102 does not, however, find the communication number associated with the client device 108*d* within the social graph. Consequently, the networking system 102 performs the act 608 of determining that the communication number does not correspond to an account. In some embodiments, having found no node representing the communication number within the social graph, the networking system 102 likewise determines that the social graph does not include a user node representing an account associated with the client device 108*d*. In other words, the networking system 102 determines that the communication number associated with the client device 108*d* is not listed within profile information for an account of the networking system 102.

In response to determining that the communication number does not correspond to an account, the networking system 102 performs the act 610 of creating and sending a real-time-communication link for the video call. In some embodiments, the real-time-communication link comprises a hyperlink to a webpage of the networking system 102 that streams live video to and from the client devices 108*a* and 108*d*. Accordingly, when the intended recipient selects the real-time-communication link, the link includes instructions that direct a client device to open a web browser and navigate to a specific webpage. Alternatively, in some embodiments, the real-time-communication link comprises a link for another software application on the recipient's client device to receive and transmit live video through the networking system 102. In any event, as shown in FIG. 6, the networking system 102 sends the real-time-communication link to the client device 108*d*.

After receiving the real-time-communication link, the client device 108*d* detects a selection by the user 112*d* of the link. The client device 108*d* then sends an indication of the select of the real-time-communication to the networking system 102. As shown in FIG. 6, the networking system 102 performs the act 612 of receiving an indication of a selection of the real-time communication link from the client device 108*d*. For example, the networking system 102 may receive an indication from the client device 108*d* of a selection to join an ongoing video call or accept an invitation to participate in a video call.

In addition to receiving the indication, in some embodiments, the networking system 102 verifies an identity of the user 112*d* before streaming live video. For example, in some embodiments, the networking system 102 requests and receives from the client device 108*d* an identification of the communication number without user input. Additionally, in some embodiments, the networking system 102 sends a request to the client device 108*d* for the user 112*d* to enter the communication number to which an invitation to participate in a video call was sent and/or a code or password with which the invitation was sent. In certain embodiments, the networking system 102 sends the code or password separately. In some such embodiments, only after confirming that the user 112*d* who selected the real-time-communication link also can enter the communication number and/or a code or password, the networking system 102 transmits video streams.

As shown in FIG. 6, after receiving an indication of the selection, the networking system 102 then performs the act 614*a* of transmitting a video stream from the client device 108*a* to the client device 108*d*. Conversely, the networking system 102 also performs the act 614*b* of transmitting a video stream from the client device 108*d* to the client device 108*a*. In some such embodiments, the networking system 102 and the client devices 108a and 108d use SIP to transmit and receive data packets of audio and video as part of the acts 614a and 614b.

Figure 7:
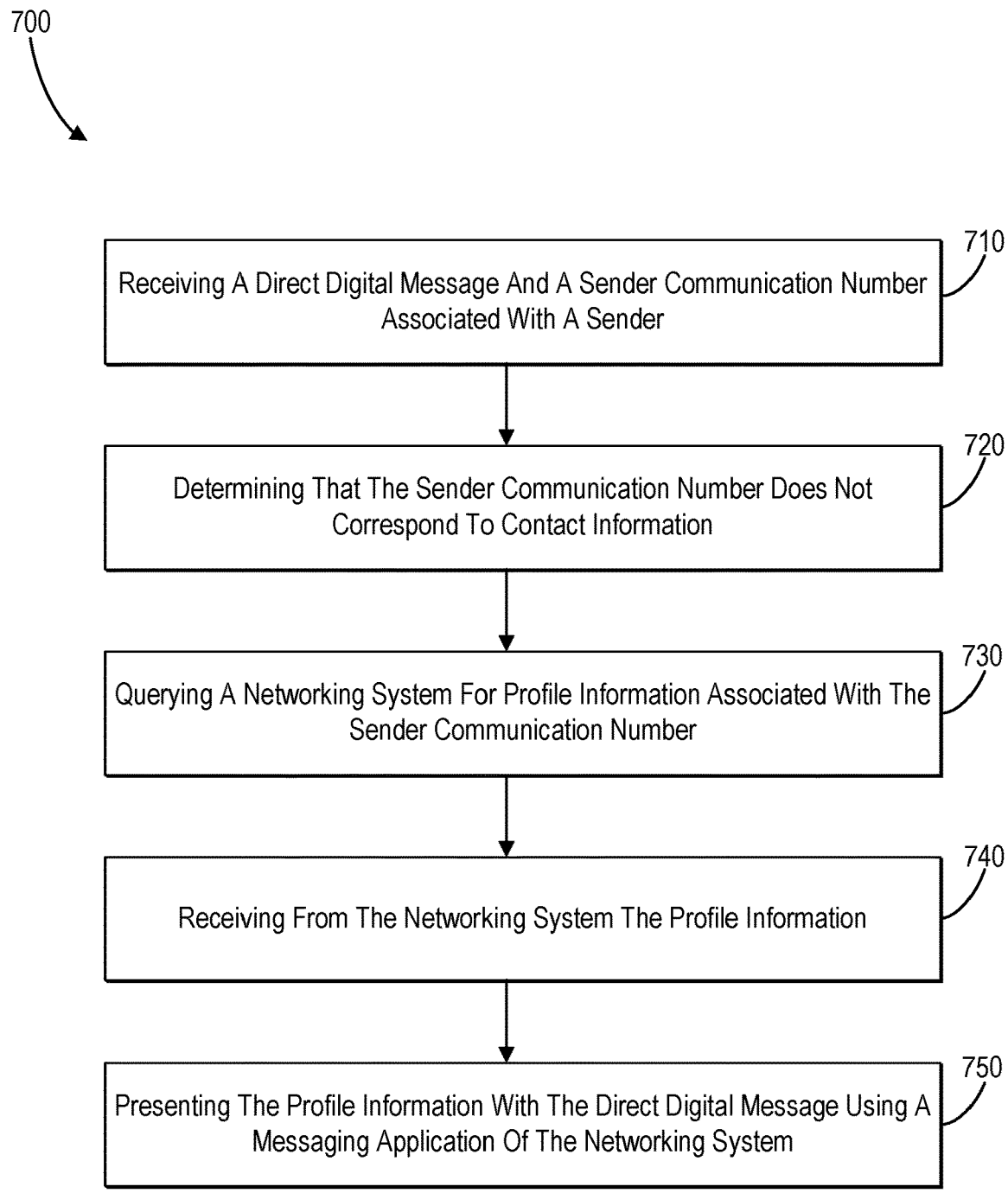
FIG. 7 illustrates a flowchart of a series of acts of providing profile information for a previously unrecognized communication number associated with a person or organization who sent a direct digital message in accordance with one or more embodiments.

Turning now to FIG. 7, this figure illustrates a flowchart of a series of acts 700 of providing profile information for a previously unrecognized communication number associated with a person or organization who sent a direct digital message in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of receiving a direct digital message and a sender communication number associated with a sender. In particular, in some embodiments, the act 710 includes receiving, through a messaging system, a direct digital message and a sender communication number associated with a sender of the direct digital message. For example, in certain embodiments, receiving the sender communication number associated with the sender of the direct digital message comprises receiving a phone number or short code associated with the sender of the direct digital message. In one or more embodiments, act 710 comprises receiving an SMS or MMS at a client device with a messaging application associated with a networking system designated to present SMS and MIMS messages as well as electronic messages from the networking system.

As further shown in FIG. 7, the acts 700 include an act 720 of determining that the sender communication number does not correspond to contact information. In particular, in some embodiments, the act 720 includes determining that the sender communication number does not correspond to contact information stored on the client device.

For example, in certain embodiments, determining that the sender communication number does not correspond to contact information stored on the client device comprises determining that no locally stored contact information includes a communication number that matches the sender communication number. For example, act 720 can comprise determining that none of the locally stored contacts on the client device include the communication number (e.g., phone number or short code) from which the SMS or MMS was sent. Alternatively, in certain embodiments, determining that the sender communication number does not correspond to contact information stored on the client device comprises receiving the sender communication number without corresponding contact information.

As further shown in FIG. 7, the acts 700 include an act 730 of querying a networking system for profile information associated with the sender communication number. For example, in some embodiments, the act 730 includes sending a request to the networking system for profile information associated with the sender communication number. In particular, act 730 can comprise requesting that the networking system provide a profile image and a name associated with the sender communication number.

As further shown in FIG. 7, the acts 700 include an act 740 of receiving from the networking system the profile information. In particular, in some embodiments, the act 740 includes receiving from the networking system the profile information associated with the communication number. For example, act 740 can comprise receiving from the networking system the profile image and the name associated with the sender communication number. In one or more embodiments, act 740 comprises receiving profile information concerning an organization associated with a phone number or short code.

As also shown in FIG. 7, the acts 700 include an act 750 of presenting the profile information with the direct digital message using a messaging application of the networking system. For example, act 750 can comprise presenting the profile image and the name with the direct digital message using the messaging application. In particular, act 750 can comprise presenting a profile picture and name from a user account of the networking account with a SMS or MMS message received from a communication number (e.g., phone number or short code) not included in a contact list on the client device. In one or more embodiments, act 750 comprises presenting the profile information concerning an organization with the direct digital message within a folder for direct digital messages for organizations using the messaging application.

Additionally, in certain embodiments, the acts 700 further include presenting a video-call option to initiate a video call with the sender of the direct digital message; detecting a selection of the video-call option; and, in response to detecting the selection of the video-call option, transmitting to the networking system a request for the sender to participate in the video call. Similarly, the acts 700 further include presenting a call option to initiate a voice-over-internet-protocol ("VoIP") audio call with the sender of the direct digital message; detecting a selection of the call option; and, in response to detecting the selection of the call option, transmitting to the social networking system a request for the sender to participate in the VoIP audio call.

Figure 8:
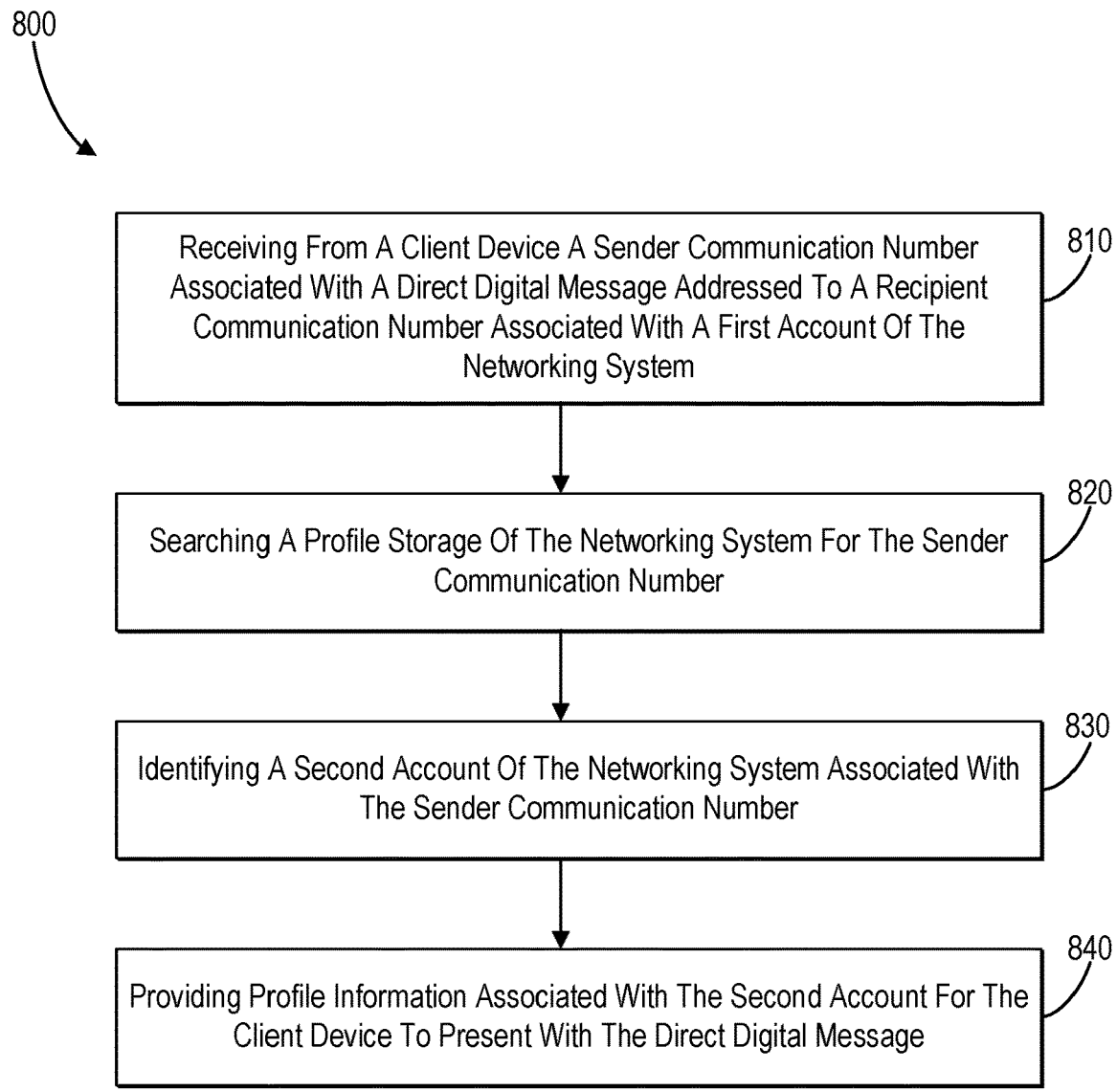
FIG. 8 illustrates a flowchart of a series of acts of providing profile information for a previously unrecognized communication number associated with a person or organization who sent a direct digital message in accordance with one or more embodiments.

Turning now to FIG. 8, this figure illustrates a flowchart of a series of acts 800 of providing profile information for a previously unrecognized communication number associated with a person or organization who sent a direct digital message in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 810 of receiving from a client device a sender communication number associated with a direct digital message addressed to a recipient communication number associated with a first account of the networking system. In particular, in some embodiments, the act 810 includes receiving, at a networking system, a sender communication number (e.g., phone number or short code) associated with an SMS or MMS received at the client device.

As further shown in FIG. 8, the acts 800 include an act 820 of searching a profile store of the networking system for the sender communication number. For example, act 820 can involve searching a social graph of a social networking system for the sender communication number.

As further shown in FIG. 8, the acts 800 include an act 830 of identifying a second account of the social networking system associated with the sender communication number. In particular, in some embodiments, the act 830 includes identifying, from within the social graph, a second account of the social networking system that the social graph associates with the sender communication number. For example, act 830 can involve identifying a first node representing the sender communication number and identifying a second node representing the second account, the first node connected by an edge to the second node.

As further shown in FIG. 8, the acts 800 include an act 840 of providing profile information associated with the second account for the client device to present with the direct digital message. In particular, in some embodiments, the act 840 includes providing, to the client device, profile information associated with the second account for the client device to present with the direct digital message using a messaging application. For example, act 840 can involve providing, to the client device, a profile image associated with the second account for the client device to present with the direct digital message.

In addition to the acts 810-840, in some embodiments, the acts 800 further include determining that profile settings for the second account grant the first account permission to access the sender communication number through the social networking system.

Additionally, in certain embodiments, the acts 800 further include receiving an additional communication number and a device identifier for an additional client device that downloaded an additional instance of the messaging application. In such embodiments, the acts 800 can further involve searching the social graph of the social networking system for the additional communication number. Based on a search of the social graph, the acts 800 can involve determining that the additional communication number does not correspond to an account of the social networking system. In response to which, the acts 800 can involve creating, within the social graph, a first node representing the additional communication number, a second node representing the device identifier, and a third node representing a third account of the social networking system.

Relatedly, in some embodiments, the acts 800 further include receiving, from the client device, an indication of a request for a user associated with the third account to participate in a video call using the messaging application. In such embodiments, the acts 800 can involve transmitting a digital invitation to the additional client device for the user associated with the third account to participate in the video call using the messaging application. The acts 800 can further involve receiving an indication from the additional client device of a selection to participate in the video call using the messaging application; and based on the indication of the selection: transmitting a first video stream from the client device to the additional client device; and transmitting a second video stream from the additional client device to the client device.

Moreover, in certain embodiments, the acts 800 further include receiving, from the client device, an indication of a request to initiate a video call addressed to an additional communication number through a messaging application; searching the social graph of the social networking system for the additional communication number; based on a search of the social graph, determining that the additional communication number does not correspond to an account of the social networking system; and sending a real-time-communication link for the video call to an additional client device associated with the additional communication number.

As noted above, the social networking system optionally provides additional communication functionalities. For example, in some embodiments, the acts 800 include providing to the client device a video-call option to initiate a video call with a user associated with the second account; receiving, from the client device, an indication of a selection of the video-call option; and, in response to receiving the indication of the selection of the video-call option, transmitting to an additional client device a request for the user associated with the second account to participate in the video call.

Similarly, in some embodiments, the acts 800 include providing to the client device a call option to initiate a voice-over-internet-protocol ("VoIP") audio call with a user associated with the second account; receiving, from the client device, an indication of a selection of the call option; and, in response to receiving the indication of the selection of the call option, transmitting to an additional client device a request for the user associated with the second account to participate in the VoIP audio call.

As also noted above, the social networking system optionally identifies direct digital messages from an organization. In some embodiments, the acts 800 include identifying, from within the social graph, the second account of the social networking system that the social graph associates with the sender communication number comprises identifying, from within the social graph, an account for an organization associated with an organizational page of the social networking system that the social graph associates with the sender communication number; and providing, to the client device, the profile information associated with the second account for the client device to present with the direct digital message using the messaging application comprises providing, to the client device, the profile information to present with the direct digital message within a folder for direct digital messages from organizations, the profile information comprising an indicator that the second account belongs to the organization.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
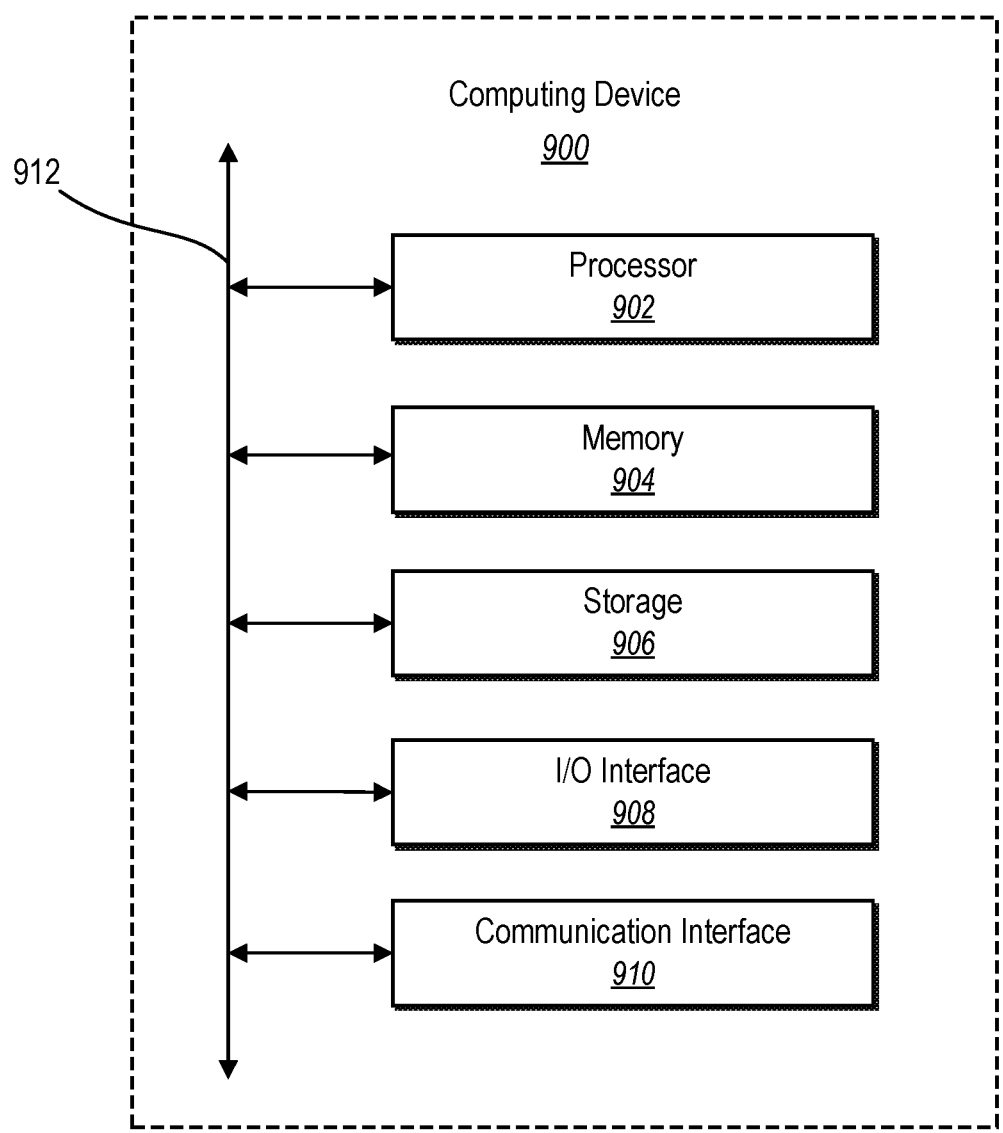
FIG. 9 illustrates a block diagram of an example computing device in accordance with one or more embodiments.

FIG. 9 illustrates a block diagram of exemplary computing device 900 that may be configured to perform one or more of the processes described above. One will appreciate that one or more computing devices such as the computing device 900 may implement the networking system 102. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example, and not by way of limitation, the processor 902 may include one or more instruction caches, one or more data caches, and one or more translation lookaside buffers ("TLBs"). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The storage device 906 includes storage for storing data or instructions. As an example, and not by way of limitation, storage device 906 can comprise a non-transitory storage medium described above. The storage device 906 may include a hard disk drive ("HDD"), flash memory, an optical disc, a magneto-optical disc, magnetic tape, or a Universal Serial Bus ("USB") drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touchscreen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 910 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 910 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 10:
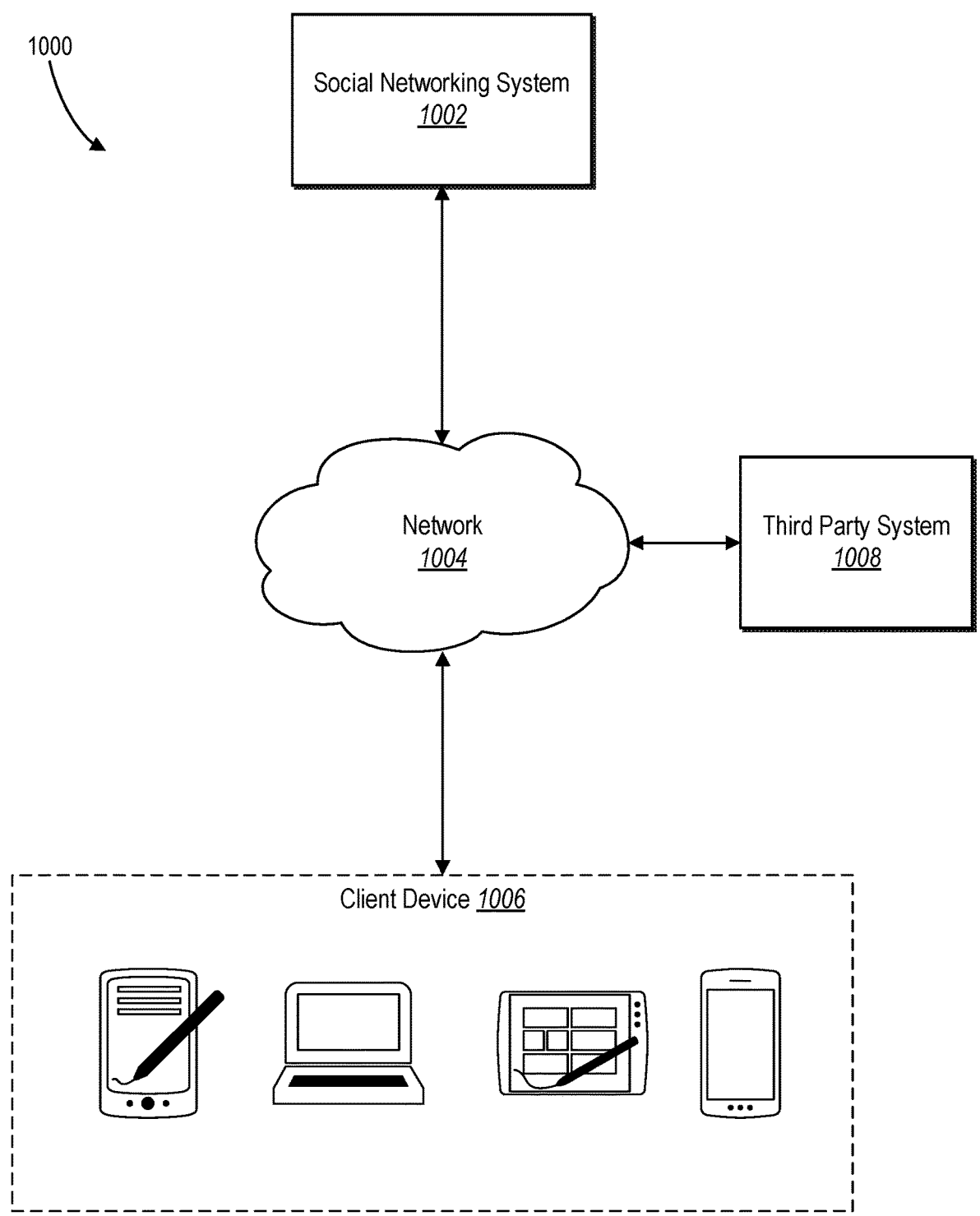
FIG. 10 illustrates a network environment of a social networking system according to one or more embodiments.

FIG. 10 illustrates an example network environment 1000 of a social-networking system. Network environment 1000 includes a client device 1006, a social networking system 1002, and a third-party system 1008 connected to each other by a network 1004. The social-networking system 1002 is an example implementation of the networking system 102 described above. Although FIG. 10 illustrates a particular arrangement of client device 1006, social networking system 1002, third-party system 1008, and network 1004, this disclosure contemplates any suitable arrangement of client device 1006, social networking system 1002, third-party system 1008, and network 1004. As an example, and not by way of limitation, two or more of client device 1006, social networking system 1002, and third-party system 1008 may be connected to each other directly, bypassing network 1004. As another example, two or more of client device 1006, social networking system 1002, and third-party system 1008 may be physically or logically co-located with each other in whole or in part. Moreover, although FIG. 10 illustrates a particular number of client devices 1006, social networking systems 1002, third-party systems 1008, and networks 1004, this disclosure contemplates any suitable number of client devices 1006, social networking systems 1002, third-party systems 1008, and networks 1004. As an example, and not by way of limitation, network environment 1000 may include multiple client devices 1006, social networking systems 1002, third-party systems 1008, and networks 1004.

This disclosure contemplates any suitable network 1004. As an example and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, social networking system 1002, and third-party system 1008 to communication network 1004 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example and not by way of limitation, a client device 1006 may include any of the computing devices discussed above in relation to FIG. 10. A client device 1006 may enable a network user at client device 1006 to access network 1004. A client device 1006 may enable its user to communicate with other users at other client devices 1006.

In particular embodiments, client device 1006 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1006 may enter a Uniform Resource Locator ("URL") or other address directing the web browser to a particular server (such as server, or a server associated with a third-party system 1008), and the web browser may generate a Hyper Text Transfer Protocol ("HTTP") request and communicate the HTTP request to server. The server may accept the HTTP request and communicate to client device 1006 one or more Hyper Text Markup Language ("HTML") files responsive to the HTTP request. Client device 1006 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 1002 may be a network-addressable computing system that can host an online social network. Social networking system 1002 may generate, store, receive, and send social-networking data, such as, for example, user-profile data, concept-profile data, social-graph information, or other suitable data related to the online social network. Social networking system 1002 may be accessed by the other components of network environment 1000 either directly or via network 1004. In particular embodiments, social networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, a social networking system 1002, or a third-party system 1008 to manage, retrieve, modify, add, or delete, the information stored in data store.

In particular embodiments, social networking system 1002 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 1002 may provide users of the online social network the ability to communicate and interact with other users. In particular embodiments, users may join the online social network via social networking system 1002 and then add connections (e.g., relationships) to a number of other users of social networking system 1002 whom they want to be connected to. Herein, the term "friend" may refer to any other user of social networking system 1002 with whom a user has formed a connection, association, or relationship via social networking system 1002.

In particular embodiments, social networking system 1002 may provide users with the ability to take actions on various types of items or objects, supported by social networking system 1002. As an example and not by way of limitation, the items and objects may include groups or social networks to which users of social networking system 1002 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 1002 or by an external system of third-party system 1008, which is separate from social networking system 1002 and coupled to social networking system 1002 via a network 1004.

In particular embodiments, social networking system 1002 may be capable of linking a variety of entities. As an example and not by way of limitation, social networking system 1002 may enable users to interact with each other as well as receive content from third-party systems 1008 or other entities, or to allow users to interact with these entities through an application programming interfaces ("API") or other communication channels.

In particular embodiments, a third-party system 1008 may include one or more types of servers, one or more data stores, one or more interfaces, including but not limited to APIs, one or more web services, one or more content sources, one or more networks, or any other suitable components, e.g., that servers may communicate with. A third-party system 1008 may be operated by a different entity from an entity operating social networking system 1002. In particular embodiments, however, social networking system 1002 and third-party systems 1008 may operate in conjunction with each other to provide social-networking services to users of social networking system 1002 or third-party systems 1008. In this sense, social networking system 1002 may provide a platform, or backbone, which other systems, such as third-party systems 1008, may use to provide social-networking services and functionality to users across the Internet.

In particular embodiments, a third-party system 1008 may include a third-party content object provider. A third-party content object provider may include one or more sources of content objects, which may be communicated to a client device 1006. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 1002 also includes user-generated content objects, which may enhance a user's interactions with social networking system 1002. User-generated content may include anything a user can add, upload, send, or "post" to social networking system 1002. As an example and not by way of limitation, a user communicates posts to social networking system 1002 from a client device 1006. Posts may include data such as status updates or other textual data, location information, photos, videos, links, music or other similar data or media. Content may also be added to social networking system 1002 by a third-party through a "communication channel," such as a newsfeed or stream.

In particular embodiments, social networking system 1002 may include a variety of servers, sub-systems, programs, modules, logs, and data stores. In particular embodiments, social networking system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 1002 may also include suitable components such as network interfaces, security mechanisms, load balancers, failover servers, management-and-network-operations consoles, other suitable components, or any suitable combination thereof. In particular embodiments, social networking system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 1002 to one or more client devices 1006 or one or more third-party system 1008 via network 1004. The web server may include a mail server or other messaging functionality for receiving and routing messages between social networking system 1002 and one or more client devices 1006. An API-request server may allow a third-party system 1008 to access information from social networking system 1002 by calling one or more APIs. An action logger may be used to receive communications from a web server about a user's actions on or off social networking system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of social networking system 1002. A privacy setting of a user determines how particular information associated with a user can be shared. The authorization server may allow users to opt in to or opt out of having their actions logged by social networking system 1002 or shared with other systems (e.g., third-party system 1008), such as, for example, by setting appropriate privacy settings. Third-party-content-object stores may be used to store content objects received from third parties, such as a third-party system 1008. Location stores may be used for storing location information received from client devices 1006 associated with users. Advertisement-pricing modules may combine social information, the current time, location information, or other suitable information to provide relevant advertisements, in the form of notifications, to a user.

Figure 11:
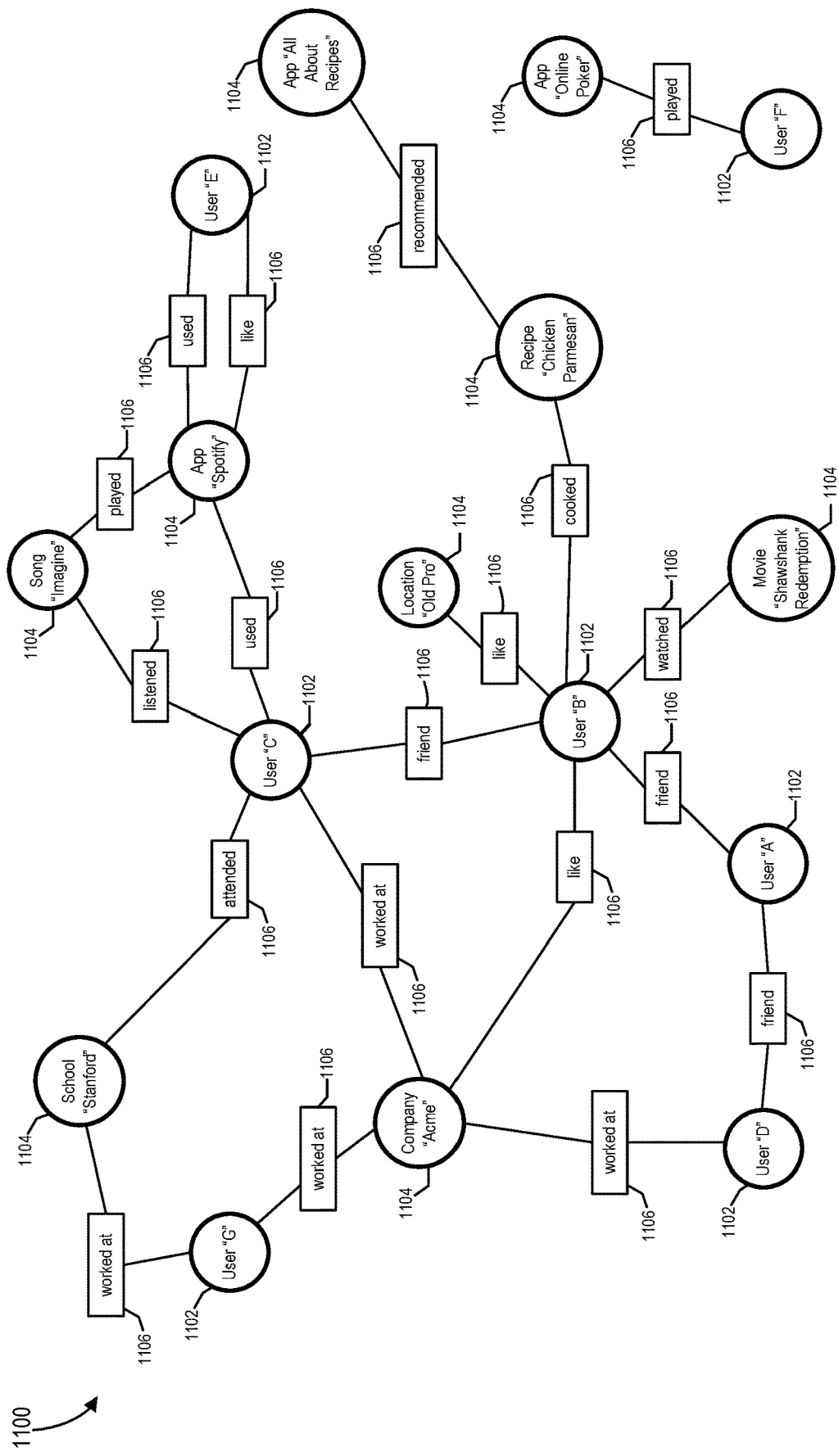
FIG. 11 illustrates an example social graph for a social networking system in accordance with one or more embodiments.

FIG. 11 illustrates example social graph 1100. In particular embodiments, social networking system 1002 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social networking system 1002, client device 1006, or third-party system 1008 may access social graph 1100 and related social-graph information for suitable applications. The nodes and edges of social graph 1100 may be stored as data objects, for example, in a data store (such as a social-graph database). Such a data store may include one or more searchable or query able indexes of nodes or edges of social graph 1100.

In particular embodiments, a user node 1102 may correspond to a user of social networking system 1002. As an example and not by way of limitation, a user may be an individual (human user), an entity (e.g., an enterprise, business, or third-party application), or a group (e.g., of individuals or entities) that interacts or communicates with or over social networking system 1002. In particular embodiments, when a user registers for an account with social networking system 1002, social networking system 1002 may create a user node 1102 corresponding to the user, and store the user node 1102 in one or more data stores. Users and user nodes 1102 described herein may, where appropriate, refer to registered users and user nodes 1102 associated with registered users. In addition, or as an alternative, users and user nodes 1102 described herein may, where appropriate, refer to users that have not registered with social networking system 1002. In particular embodiments, a user node 1102 may be associated with information provided by a user or information gathered by various systems, including social networking system 1002. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1104 may correspond to a concept. As an example and not by way of limitation, a concept may correspond to a place (such as, for example, a movie theater, restaurant, landmark, or city); a website (such as, for example, a website associated with social networking system 1002 or a third-party website associated with a web-application server); an entity (such as, for example, a person, business, group, sports team, or celebrity); a resource (such as, for example, an audio file, video file, digital photo, text file, structured document, or application) which may be located within social networking system 1002 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social networking system 1002. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept nodes 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social networking system 1002. Profile pages may also be hosted on third-party websites associated with a third-party system 1008. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept nodes 1104.

In particular embodiments, a concept node 1104 may represent a third-party webpage or resource hosted by a third-party system 1008. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1006 to send to social networking system 1002 a message indicating the user's action. In response to the message, social networking system 1002 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social networking system 1002 may send a "friend request" to the second user. If the second user confirms the "friend request," social networking system 1002 may create an edge 1106 connecting the first user's user node 1102 to the second user's user node 1102 in social graph 1100 and store edge 1106 as social-graph information in one or more of data stores. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social networking system 1002 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1002 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social networking system 1002 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept nodes 1104 for "SPOTIFY").

In particular embodiments, social networking system 1002 may create an edge 1106 between a user node 1102 and a concept node 1104 in social graph 1100. As an example and not by way of limitation, a user viewing a concept-profile page (such as, for example, by using a web browser or a special-purpose application hosted by the user's client device 1006) may indicate that he or she likes the concept represented by the concept nodes 1104 by clicking or selecting a "Like" icon, which may cause the user's client device 1006 to send to social networking system 1002 a message indicating the user's liking of the concept associated with the concept-profile page. In response to the message, social networking system 1002 may create an edge 1106 between user node 1102 associated with the user and concept nodes 1104, as illustrated by "like" edge 1106 between the user and concept nodes 1104. In particular embodiments, social networking system 1002 may store an edge 1106 in one or more data stores. In particular embodiments, an edge 1106 may be automatically formed by social networking system 1002 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 1002). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1002 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1002) or RSVP (e.g., through social networking system 1002) to an event associated with the advertisement. In addition or as an alternative, an advertisement may include social-networking-system context directed to the user. As an example and not by way of limitation, an advertisement may display information about a friend of the user within social networking system 1002 who has taken an action associated with the subject matter of the advertisement.

In particular embodiments, social networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1002 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1002 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1002 may calculate a coefficient based on a user's actions. Social networking system 1002 may monitor such actions on the online social network, on a third-party system 1008, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1002 may calculate a coefficient based on the user's actions with particular types of content. The content may be associated with the online social network, a third-party system 1008, or another suitable system. The content may include users, profile pages, posts, news stories, headlines, instant messages, chat room conversations, emails, advertisements, pictures, video, music, other suitable objects, or any combination thereof. Social networking system 1002 may analyze a user's actions to determine whether one or more of the actions indicate an affinity for subject matter, content, other users, and so forth. As an example and not by way of limitation, if a user may make frequently posts content related to "coffee" or variants thereof, social networking system 1002 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1002 may calculate a coefficient based on the type of relationship between particular objects. Referencing the social graph 1100, social networking system 1002 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1002 may determine that the user has a higher coefficient with respect to the first photo than the second photo because having a tagged-in-type relationship with content may be assigned a higher weight and/or rating than having a like-type relationship with content. In particular embodiments, social networking system 1002 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1002 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, social networking system 1002 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1006 of the user). A first user may be more interested in other users or concepts that are closer to the first user. As an example and not by way of limitation, if a user is one mile from an airport and two miles from a gas station, social networking system 1002 may determine that the user has a higher coefficient for the airport than the gas station based on the proximity of the airport to the user.

In particular embodiments, social networking system 1002 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1002 may provide information that is relevant to user's interests and current circumstances, increasing the likelihood that they will find such information of interest. In particular embodiments, social networking system 1002 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1002 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1002 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1008 (e.g., via an API or other communication channel), or from another suitable system. In response to the request, social networking system 1002 may calculate the coefficient (or access the coefficient information if it has previously been calculated and stored). In particular embodiments, social networking system 1002 may measure an affinity with respect to a particular process. Different processes (both internal and external to the online social network) may request a coefficient for a particular object or set of objects. Social networking system 1002 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by social networking system 1002 or shared with other systems (e.g., third-party system 1008). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1008, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1002 may send a request to the data store for the object. The request may identify the user associated with the request and may only be sent to the user (or a client device 1006 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a client device to:
   receive, through a messaging system, a direct digital message and a sender communication number associated with a sender of the direct digital message;
   determine that the sender communication number does not correspond to contact information stored on the client device;
   query a social networking system for profile information associated with the sender communication number and maintained by the social networking system for display as part of a user profile of the sender;
   receive from the social networking system an organization indicator identifying the sender as an organization associated with the sender communication number, a profile image for the organization, and a profile name for the organization; and based on receiving the organization indicator, present the profile image and the profile name for the organization with a message indicator for the direct digital message within an organization-messages folder for direct digital messages from organizations using a messaging application of the social networking system.

2. The non-transitory computer readable medium of claim 1, further comprising instructions that, when executed by the at least one processor, cause the client device to receive the sender communication number associated with the sender of the direct digital message by receiving a phone number or a short code associated with the sender of the direct digital message.

3. The non-transitory computer readable medium of claim 1, further comprising instructions that, when executed by the least one processor, cause the client device to determine that the sender communication number does not correspond to contact information stored on the client device by determining that no locally stored contact information includes a communication number that matches the sender communication number.

4. The non-transitory computer readable medium of claim 1, further comprising instructions that, when executed by the at least one processor, cause the client device to determine that the sender communication number does not correspond to contact information stored on the client device by receiving the sender communication number without corresponding contact information.

5. The non-transitory computer readable medium of claim 1, further comprising instructions that, when executed by the at least one processor, cause the client device to query the social networking system for the profile information associated with the sender communication number by sending a request to the social networking system for the profile information associated with the sender communication number.

6. The non-transitory computer readable medium of claim 1, further comprising instructions that, when executed by the at least one processor, cause the client device to:
detect a selection of the organization-messages folder; and
in response to detecting the selection of the organization-messages folder, present a received-organization-messages preview comprising a preview message of the direct digital message using the messaging application.

7. The non-transitory computer readable medium of claim 1, further comprising instructions that, when executed by the at least one processor, cause the client device to:
present a video-call option to initiate a video call with the sender of the direct digital message;
detect a selection of the video-call option; and
in response to detecting the selection of the video-call option, transmit to the social networking system a request for the sender to participate in the video call.

8. The non-transitory computer readable medium of claim 1, further comprising instructions that, when executed by the at least one processor, cause the client device to:
receive an additional direct digital message and a short code associated with an additional sender of the additional direct digital message; and
based in part on receiving the short code associated with the send of the additional direct digital message, present an additional message indicator for the additional direct digital message within the organization-messages folder for direct digital messages from organizations using the messaging application.

9. The non-transitory computer readable medium of claim 1, further comprising instructions that, when executed by the at least one processor, cause the client device to:
receive from the social networking system the organization indicator identifying the sender as the organization by receiving an organization-category indicator identifying a specific type of organization for the organization; and
present the message indicator for the direct digital message within the organization-messages folder for direct digital messages from organizations by presenting the message indicator for the direct digital message within a specific organization-messages folder for direct digital messages from organizations of the specific type of organization.

10. A method comprising:
receiving, from a client device, a sender communication number associated with a direct digital message addressed to a recipient communication number, the recipient communication number associated with a first account of a social networking system;
searching a profile storage of the social networking system for the sender communication number;
identifying, from within the profile storage:
a second account of the social networking system that the profile storage categorizes as an organization and associates with the sender communication number; and
a profile image for the organization and a profile name for the organization maintained by the social networking system for display as part of a user profile of the organization; and
providing, to the client device, the profile image for the organization, the profile name for the organization, and an organization indicator identifying the sender as the organization to cause the client device to present the profile image for the organization and the profile name for the organization with a message indicator for the direct digital message within an organization-messages folder for direct digital messages from organizations using a messaging application.

11. The method of claim 10, further comprising determining that profile settings for the second account grant permission to the first account to access the sender communication number through the social networking system.

12. The method of claim 10, wherein identifying, from within the profile storage, the second account of the social networking system that the profile storage categorizes as the organization and associates with the sender communication number comprises:
identifying a first node within a social graph representing the sender communication number; and
identifying a second node within the social graph representing the second account for the organization, the first node connected by an edge to the second node.

13. The method of claim 10, further comprising:
receiving an additional communication number and a device identifier for an additional client device that downloaded an additional instance of the messaging application;
searching the profile storage of the social networking system for the additional communication number;

based on a search of the profile storage, determining that the additional communication number does not correspond to an account of the social networking system; and creating, within a social graph, a first node representing the additional communication number, a second node representing the device identifier, and a third node representing a third account of the social networking system.

14. The method of claim 13, further comprising:

receiving, from the client device, an indication of a request for a user associated with the third account to participate in a video call using the messaging application;

transmitting a digital invitation to the additional client device for the user associated with the third account to participate in the video call using the messaging application;

receiving an indication from the additional client device of a selection to participate in the video call using the messaging application; and based on the indication of the selection:
transmitting a first video stream from the client device to the additional client device; and
transmitting a second video stream from the additional client device to the client device.

15. The method of claim 10, further comprising:

receiving, from the client device, an indication of a request to initiate a video call addressed to an additional communication number through a messaging application;

searching the profile storage of the social networking system for the additional communication number;

based on a search of the profile storage, determining that the additional communication number does not correspond to an account of the social networking system; and sending a real-time-communication link for the video call to an additional client device associated with the additional communication number.

16. A system comprising:

at least one processor; and at least one non-transitory computer readable storage medium storing instructions that, when executed by the at least one processor, cause the system to:

receive, from a client device, a sender communication number associated with a direct digital message addressed to a recipient communication number, the recipient communication number associated with a first account of a social networking system;

search a profile storage of the social networking system for the sender communication number;

identify, from within the profile storage:
a second account of the social networking system that the profile storage categorizes as an organization and associates with the sender communication number; and a profile image for the organization and a profile name for the organization maintained by the social networking system for display as part of a user profile of the sender; and provide, to the client device, the profile image for the organization, the profile name for the organization, and an organization indicator identifying the sender as the organization to cause the client device to present the profile image for the organization and the profile name for the organization with a message indicator for the direct digital message within an organization-messages folder for direct digital messages from organizations using a messaging application.

17. The system of claim 16, further comprising instructions that, when executed by the at least one processor, cause the system to identify, from within the profile storage, the second account of the social networking system that the profile storage categorizes as the organization and associates with the sender communication number by:

identifying a first node within a social graph representing the sender communication number; and identifying a second node within the social graph representing the second account for the organization, the first node connected by an edge to the second node.

18. The system of claim 16, further comprising instructions that, when executed by the at least one processor, cause the system to:

identify, from within the profile storage, the second account of the social networking system that the profile storage categorizes as the organization and associates with the sender communication number by determining that the profile storage categorizes the second account as a specific type of organization; and provide, to the client device, the organization indicator by providing an organization-category indicator identifying the specific type of organization for the organization.

19. The system of claim 16, further comprising instructions that, when executed by the at least one processor, cause the system to:

provide to the client device a call option to initiate a voice-over-internet-protocol ("VoIP") audio call with the organization associated with the second account;

receive, from the client device, an indication of a selection of the call option; and in response to receiving the indication of the selection of the call option, transmit to an additional client device a request for the organization associated with the second account to participate in the VoIP audio call.

20. The system of claim 16, further comprising instructions that, when executed by the at least one processor, cause the system to identify, from within the profile storage, the second account of the social networking system that the profile storage categorizes as the organization and associates with the sender communication number by identifying, from within a social graph, an account for the organization associated with an organizational page of the social networking system that the social graph associates with the sender communication number.

* * * * *